US012704032B2

(12) United States Patent
Al-Nakhli et al.

(10) Patent No.: US 12,704,032 B2
(45) Date of Patent: Aug. 11, 2026

(54) METHOD FOR MITIGATING BARITE SAG IN WATER-BASED MUD WITH THERMOCHEMICAL FLUID

(71) Applicants: SAUDI ARABIAN OIL COMPANY, Dhahran (SA); KING FAHD UNIVERSITY OF PETROLEUM & MINERALS, Dhahran (SA)

(72) Inventors: Ayman R Al-Nakhli, Dammam (SA); Olalekan Alade, Dhahran (SA); Mohamed Mahmoud, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 425 days.

(21) Appl. No.: 18/356,974

(22) Filed: Jul. 21, 2023

(65) Prior Publication Data

US 2025/0027375 A1 Jan. 23, 2025

(51) Int. Cl.

*G06Q 10/10* (2023.01)
*C09K 8/16* (2006.01)
*E21B 21/06* (2006.01)
*G06Q 10/06* (2023.01)
*G06Q 30/02* (2023.01)
*G06Q 30/06* (2023.01)

(52) U.S. Cl.

CPC .............. *E21B 21/062* (2013.01); *C09K 8/16* (2013.01); *E21B 21/068* (2013.01)

(58) Field of Classification Search

CPC .. E21B 21/062; E21B 21/068; E21B 2200/20; C09K 8/16; C09K 8/03

USPC .................................................. 705/1.1–912

See application file for complete search history.

(56) References Cited

U.S. PATENT DOCUMENTS

| | | |
|---|---|---|
| 9,187,966 B2 | 11/2015 | Kulkarni et al. |
| 9,587,162 B2 | 3/2017 | Fisk, Jr. |
| 10,557,089 B2 | 2/2020 | Perez-Cordova |
| 11,414,585 B2 | 8/2022 | Elkatatny |
| 11,518,925 B2 | 12/2022 | Mahmoud |

(Continued)

OTHER PUBLICATIONS

Ansari, S., Rashid, M.I., Waghmare, P.R et al. Measurement of the flow behavior index of Newtonian and shear-thinning fluids via analysis of the flow velocity characteristics in a mini-channel. SN Appl. Sci. 2, 1787, 20201008. https://doi.org/10.1007/s42452-020-03561-w (Year: 2020).*

(Continued)

*Primary Examiner* — Jonathan P Ouellette

(74) *Attorney, Agent, or Firm* — Osha Bergman Watanabe & Burton LLP

(57) ABSTRACT

Described is a method for mitigating particulate settling in a drilling fluid. A set of rheological data for a first drilling fluid is obtained, where the set of rheological data includes a measured viscosity value. A thermal effect of the measured viscosity value is determined, and a predicted viscosity value for a second drilling fluid having a similar composition as the first drilling fluid is determined based on the thermal effect. Based on the predicted viscosity value, an amount of a thermochemical fluid to add to the second drilling fluid is determined to increase a temperature and a viscosity of the second drilling fluid such that settling of a particulate is mitigated.

14 Claims, 16 Drawing Sheets

(56) References Cited

U.S. PATENT DOCUMENTS

| | | | | |
|---|---|---|---|---|
| 12,234,704 | B2 * | 2/2025 | Al Mulhem | G08B 21/18 |
| 2007/0169932 | A1 * | 7/2007 | Lindvig | C09K 8/52 166/250.1 |
| 2017/0298270 | A1 * | 10/2017 | Shindgikar | C09K 8/90 |
| 2020/0317981 | A1 | 10/2020 | Mohamed et al. | |
| 2021/0095187 | A1 * | 4/2021 | Radwan | C06D 5/10 |

OTHER PUBLICATIONS

Olalekan Alade, Mohamed Mahmoud, Ayman Al-Nakhli, "Rheological studies and numerical investigation of barite sag potential of drilling fluids with thermochemical fluid additive using computational fluid dynamics (CFD)," Journal of Petroleum Science and Engineering, vol. 220, Part A, Nov. 5, 2022. (Year: 2022).*

Basfar, Salem et al., "Prevention of Barite Sagging while Drilling High-Pressure High-Temperature (HPHT) Wells"; Proceedings of the SPE Kingdom of Saudi Arabia Annual Technical Symposium and Exhibition; Paper No. SPE-192198-MS; pp. 1-12; Apr. 23, 2018 (12 pages).

Dye, William et al., "Correlation of Ultralow-Shear-Rate Viscosity and Dynamic Barite Sag"; SPE Drilling & Completion; vol. 16, Issue 01, Paper No. SPE-70128-PA; pp. 27-34; Mar. 2001 (8 pages).

Ofei, Titus Ntow et al., "Barite Sag Measurements"; Proceedings of the IADC/SPE International Drilling Conference and Exhibition; Paper No. SPE-199567-MS; pp. 1-21; Feb. 25, 2020 (21 pages).

Tariq, Zeeshan et al., "Self-destructive barite filter cake in water-based and oil-based drilling fluids"; Journal of Petroleum Science and Engineering; vol. 197, Article 107963; pp. 1-9; Feb. 2021 (9 pages).

Alade, Olalekan et al., "Rheological studies and numerical investigation of barite sag potential of drilling fluids with thermochemical fluid additive using computational fluid dynamics (CFD)"; Journal of Petroleum Science and Engineering; vol. 220, Part A, Article 111179; pp. 1-17; Jan. 2023 (17 pages).

Alade, Olalekan S et al., "A preliminary assessment of thermochemical fluid for heavy oil recovery"; Journal of Petroleum Science and Engineering; vol. 186, Article 106702; pp. 1-10; Mar. 2020 (10 pages).

International Search Report issued in corresponding international patent application No. PCT/US2024/038724, mailed Nov. 18, 2024 (5 pages).

Written Opinion issued in corresponding international patent application No. PCT/US2024/038724, mailed Nov. 18, 2024 (12 pages).

* cited by examiner

200

FIG. 8A
3RPM
6RPM
10RPM
100RPM
300RPM
600RPM
High particle concentration
Low particle concentration

METHOD FOR MITIGATING BARITE SAG IN WATER-BASED MUD WITH THERMOCHEMICAL FLUID

BACKGROUND

Particulate segregation is a common phenomenon in drilling operations. At different flow regimes, solid components of the drilling fluids tend to segregate under the influence of various factors, including physical properties of the particles (e.g., size, shape, density) and properties of the dispersing fluid and operating conditions. The settling and/or sagging of weighting materials in drilling fluids is a concern when drilling and completing a well. For instance, the segregation of barite weighting component in drilling fluid, commonly referred to as barite sag, may lead to various complications, such as annular pressure build-up, control problems (e.g., loss of wellbore control), stuck pipes, plugged boreholes, lost circulation, high torque, and problematic cement jobs. Additionally, barite sag may lead to variations in drilling fluid density. The presence of sag is known to be the cause for gas kicks, and oil-based drilling fluids are known to be more vulnerable to sag than water-based drilling fluids.

Investigations into barite sag mechanisms may play a role in developing field guidelines to manage the consequences of barite sag. Knowledge of drilling fluid behavior may enable successful operations. Drilling fluid, or drilling mud, properties, including rheology, density, properties of weighting material, and chemical treatments, are all factors that may influence barite sag. Various techniques have been developed for detecting particle sagging potential in drilling fluids, such as using a standard viscometer and lab-scale flow loops. Many studies have employed experimental approaches to evaluating barite sag problems as related to the rheology of the drilling fluids.

Growing advancements in drilling technology and diverse operational requirements have brought significant complexity to the formulation of drilling fluids. One advancement is the encapsulation of thermochemical fluid (TCF) in a mud formulation with the purpose of generating heat during drilling operations. Heat generated is expected to enhance the dissolution and/or removal of filter cakes, which may be formed during drilling operations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for mitigating particulate settling in drilling fluid. A set of rheological data, including a measured viscosity value, is obtained for a first drilling fluid having a composition. A thermal effect of the measured viscosity value is determined and used to determine a predicted viscosity value for a second drilling fluid having a composition that is similar to the composition of the first drilling fluid. An amount of a thermochemical fluid to add to the second drilling fluid to increase a temperature and a viscosity of the second drilling fluid such that settling of a particulate is mitigated is then determined.

In another aspect, the thermal effect is a temperature dependency of the measured viscosity value.

In another aspect, a flow consistency index K and a flow behavior index n for the first drilling fluid are determined according to the following:

$$\mu_a = K\dot{\gamma}^{n-1} \text{ and}$$

$$\ln\mu_a = \ln K + (n-1)\ln\dot{\gamma},$$

where $\mu_a$ is the measured viscosity value and $\dot{\gamma}$ is a shear rate.

In another aspect, the predicted viscosity value $\mu_a$ is determined according to the following:

$$\mu_p = K_0\exp\left(\frac{E_a}{RT}\right)\dot{\gamma}^{n-1},$$

where $K_o$ is the thermal effect, $E_\alpha$ is a flow activation energy, R is a universal gas constant, and T denotes temperature.

In another aspect, the thermochemical fluid comprises one or more of $NH_4Cl$ and $NaNO_2$.

In another aspect, the thermochemical fluid is added to the second drilling fluid in amount ranging from 3 mol/dm$^3$ to 5 mol/dm$^3$.

In another aspect, the first drilling fluid and the second drilling fluid are water-based drilling fluids.

In another aspect the particulate is barite.

In another aspect, the amount of the thermochemical fluid is determined based on a quantity of the second drilling fluid, a heat capacity of the second drilling fluid, and a heat capacity of the thermochemical fluid.

In one aspect, embodiments disclosed herein relate to a system for mitigating particulate settling in drilling fluid.

Other aspects and advantages of the claimed subject matter will be apparent from the following description and the appended claims.

DETAILED DESCRIPTION

Figure 1:
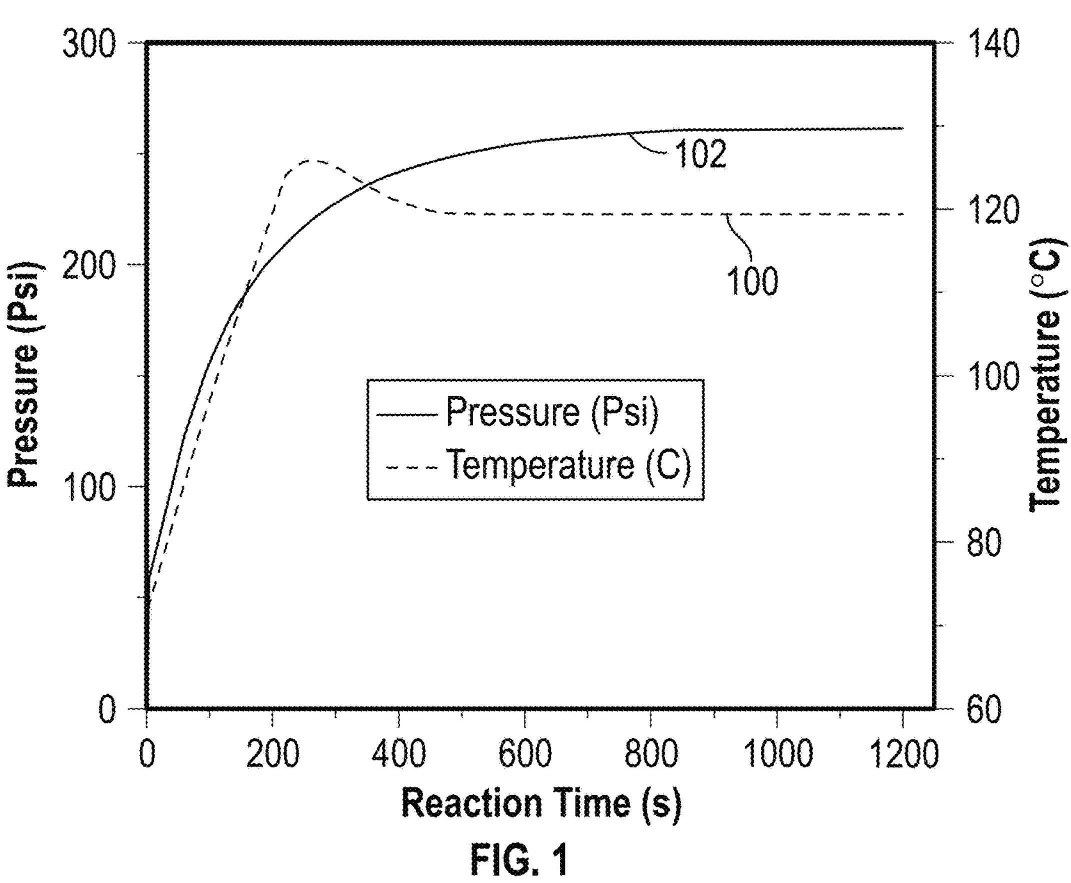
FIG. 1 is a plot illustrating temperature and pressure released from a typical thermochemical reaction according to one or more embodiments of the present disclosure.

In one aspect, embodiments disclosed herein relate to a method for improving the rheological performance of water-based drilling fluid against particle settling, or sagging, using a thermochemical fluid (TCF) as an additive. Barite sagging of water-based mud (WBM) with encapsulated TCF, referred to as WBM_TCF, was investigated. Specifically, a computational fluid dynamics (CFD) technique was applied to rheological data obtained from the base fluid, WBM. Additionally, thermal activation energy was incorporated into the CFD simulation scheme due to the known effect of temperature on the fluid rheology.

In one or more embodiments, the WBM_TCF comprises a nitrite-containing compound and an ammonium-containing compound encapsulated together in copolymer micro-particles, forming encapsulated thermochemical compounds.

In one or more embodiments, thermochemical compounds may include both ammonium-containing compounds and nitrite-containing compounds to act as the encapsulated thermochemicals. For example, the ammonium-containing compound may be ammonium chloride or ammonium sulfate; the nitrite-containing compound may be sodium nitrite. The thermochemical reactions of ammonium chloride and sodium nitrite are represented by Equations (1) and (2), respectively:

$$NH_4Cl + NaNO_2 \rightarrow \left[\begin{matrix} NH_4NO_2 + NaCl{\bullet}NH_4NO_2 \\ \text{Themolabile} \end{matrix}\right] \rightarrow NaCl + 2H_20 + N_2(\text{gas}) + \Delta H(\text{heat}) \tag{1}$$

$$(NH_4)2\ SO4 + NaNO_2 \rightarrow \left[\begin{matrix} NH_4NO_2 + Na2SO4 \bullet NH_4NO_2 \\ \text{Themolabile} \end{matrix}\right] \rightarrow Na2SO4 + 2H_20 + 2N_2(\text{gas}) + \Delta\ H(\text{heat}) \tag{2}$$

According to the thermochemical reactions of Equations (1) and (2), the thermochemical compounds generate "thermolabile" intermediate products, which are immediately transformed into sodium chloride or sodium sulfate (salts), nitrogen (gas), and steam (water+heat). The release of nitrogen gas generates high pressure conditions. The use of ammonium sulfate generates more pressure than the use of ammonium chloride in thermochemical reactions under the same conditions.

As used, the term "thermochemicals" may also be referred to as "thermochemical compounds" or "thermochemical reactants," and may include chemicals that exothermically react to produce heat and pressure. Thermochemicals may be provided in a fluid solution (for example, a diluted or concentrated solution containing one or more types of thermochemicals) or in a dry form (for example, a powder). In one or more embodiments, thermochemical compounds may include, but are not limited to, urea, sodium hypochlorite, ammonium-containing compounds, or nitrite-containing compounds. Examples of ammonium-containing compounds include ammonium chloride, ammonium bromide, ammonium nitrate, ammonium sulfate, ammonium carbonate, and ammonium hydroxide. Examples of nitrite-containing compounds include sodium nitrite and potassium nitrite.

The concentration of thermochemical reactants used in the thermochemical reaction may be in a range of from about 0.5 to about 10 molar (M), such as from about 1 to about 5 M, such as from about 1 to about 2 M. The molar ratio of the thermochemical compounds may vary, such as 1:1 for the ratio of ammonium chloride to sodium nitrite.

The copolymer micro-particles may include delayed release copolymers of esters or acids. Other delayed release copolymers may include derivatives of formic acid, lactic acid, methyl lactate, ethyl lactate, propyl lactate, and butyl lactate. In one or more embodiments, the copolymer micro-particles encapsulating the thermochemical compounds may have a size in a range of from about 25 to about 50 microns.

The properties of the WBM_TCF are substantially similar to the corresponding property of a comparable drilling fluid composition devoid of encapsulated thermochemical compounds. In particular, physio-chemical properties, including the density, the plastic viscosity, the yield point, the gel strength, and the pH of the drilling fluid composition containing a nitrite-containing compound and an ammonium-containing compound encapsulated together in copolymer micro-particles are substantially similar to the corresponding properties of the similar drilling fluid composition not containing encapsulated thermochemical compounds. The WBM_TCF may include one or more additives, such as a rheology modifier, a pH-adjuster, a clay stabilizer, a bridging agent, a fluid loss control agent, and an emulsifier.

Using the encapsulated thermochemicals may generate heat and high pressure through exothermic reactions within the wellbore once the encapsulated thermochemicals reach a certain temperature and once the encapsulating copolymer micro-particles are decomposed. In one or more embodiment methods, the encapsulated thermochemicals are part of the drilling fluid pumped into the wellbore. The system may be controlled by using specific copolymer micro-particles sizes and thicknesses. The encapsulation may be uniformly sized microporous tubular membrane with an average micropore diameter in the range of from about 0.1 to about 30 μm, or from about 0.5 to about 25 μm, or from about 1 to about 20 μm, or from about 5 to about 10 μm.

In addition, the encapsulated thermochemicals start a thermochemical reaction when they reach a given temperature within the wellbore. This activating temperature may depend on the type of thermochemicals being used, and may be, for example, greater than about 25° C., greater than about 50° C., or greater than about 70° C. Therefore, the start of the thermochemical reaction may depend on temperature within the wellbore. Additionally, the start of the thermochemical reaction may depend on other wellbore conditions, such as pH and pressure. The thermochemical reaction releases kinetic and thermal energy, which helps remove the filter cake that is deposited on the face of the formation when the drilling fluid is added. Therefore, the method results in the self-destruction of filter cake that is formed from the barite contained in the drilling fluid and removed by the thermochemical reaction of the thermochemical compounds contained in the same drilling fluid.

The following examples are based at least in part on O. Alade, et al., "Rheological Studies and Numerical Investigation of Barite Sag Potential of Drilling Fluids with Thermochemical Fluid Additive Using Computational Fluid Dynamics (CFD), Journal of Petroleum Science and Engineering 220 (2023) 111179, which is hereby incorporated by reference as though fully set forth herein.

Example 1: Rheological Modelling of Drilling Fluids with TCF Additives

The detailed formulation of water-based mud (WBM) drilling fluids used is presented in U.S. application Ser. No. 17/721,061, which is hereby incorporated by reference as though fully set forth herein. Conventional water-based drilling fluids, referred to as WBM, were prepared without TCF. The WBM_TCF formulation of the drilling fluid was expected to form a self-destructive mud cake by releasing heat due to the exothermic reaction of the TCF additives. FIG. 1 is a plot showing temperature (100) and pressure (102) released from a typical thermochemical reaction triggered at 70° C. As shown, the TCF reaction causes a temperature rise and, simultaneously, an increase in pressure of the system, typically up to 120° C. and 250 pound per square inch (psi), when triggered at 70° C.

The viscosity of the drilling fluids was measured using the Rheometer/Dynamic Mechanical Analyser (MCR 702), produced by Anton Paar, Inc., at different temperatures and shear rates (0.001 to 1000 $s^{-1}$). The flow behavior of the fluids was evaluated by fitting the data to the two-parameter power law, Ostwald-de-Wale model function. Thus, the flow consistency index, K, and the flow behavior index, n, were calculated from the apparent viscosity ($\mu_a$) and shear rates ($\dot{\gamma}$) using Equations (1) and (2) as follows:

$$\mu_a = K\dot{\gamma}^{n-1}; \tag{1}$$

$$\ln\mu_a = \ln K + (n-1)\ln\dot{\gamma}. \tag{2}$$

The temperature dependency of the viscosity (otherwise known as thermal effect) was evaluated from the Arrhenius equation as follows:

$$K = K_0 \exp\left(\frac{E_a}{RT}\right), \tag{3}$$

where $K_o$ is the system dependent pre-exponential factor (or thermal effect), and $E_a$ is the flow activation energy, defined through Equation (4) as follows:

$$R = \frac{d\ln\mu_a}{dT^{-1}}. \tag{4}$$

Non-limiting examples of values for the aforementioned variables include the following: $K_0$: 122; $E_a$: 6930; T: 50° C. (323 K); $\rho_\alpha$: 1600; $\dot{\gamma}$: 1; and n: 0.4. $E_a$ was obtained by plotting InK vs $T^{-1}$ and multiplying the slope by the universal gas constant R (8.3144598 $Jmol^{-1}K^{-1}$). Subsequently, an expression to calculate the viscosity of the drilling fluid, based on the thermal effect, $K_o$, was developed according to the following:

$$\mu_a = K_0 \exp\left(\frac{E_a}{RT}\right)\dot{\gamma}^{n-1}. \tag{5}$$

The concentration of TCF needed to raise the temperature and alter the viscosity of the drilling fluid may be estimated by first determining the quantity of heat required by the fluid and adding the equivalent amount of TCF. The following energy balance expressions may be used:

$$\text{Heat required by the mud } (Q_{mud}) + \text{Heat lost to the surrounding } (Q_{wellbore}) = \text{Heat Released by the TCF}(Q_{TCF}). \tag{6}$$

By neglecting the heat loss:

$$Q_{mud} = Q_{TCF} \text{ and} \tag{7}$$

$$Q_{mud} = W_{mud} C_{p(mud)} \Delta T, \tag{8}$$

where $W_{mud}$ is the quantity of the mud/drilling fluid in kilograms (kg), $C_{p(mud)}$ is the heat capacity of mud (KJ/kg*K), and T is the temperature (K).

The concentration of TCF required ($W_{TCF}$(kg)) may be calculated from:

$$W_{TCF} = \frac{Q_{mud}}{C_{p(TCF)}\Delta T}, \tag{9}$$

where $C_{p(TCF)}$ is the heat capacity of TCF (KJ/kg*K). In other words, the amount of the TCF to be added is determined based on a quantity of the drilling fluid to which the TCF may be added, a heat capacity of the drilling fluid, and a heat capacity of the TCF. In one or more embodiments, the concentration of TCF is in a range of 3 to 5 moles per decimeter cubed (mol/dm$^3$) of drilling fluid. As can be appreciated by one skilled in the art, any suitable TCF may be implemented, such as $NH_4Cl$ and/or $NaNO_2$.

Example 2: Gravitational Settling of Particles (Hindered Settling Velocity: $V_{STH}$)

For a rigid particle moving through a fluid, there are three acting forces: the gravitational force; the buoyant force, which acts parallel to the external force but in the opposite direction; and the drag force, which appears whenever there is relative motion between the particle and the fluid. In fluid dynamics, Stokes' law, also referred to as drag force, is the frictional force exerted on spherical objects, such as particles, with small Reynolds numbers in a viscous fluid. For a single particle of mass (m) moving in a fluid, the net force (F) acting on the particle may be defined as the total of the downward force of gravity ($F_e$), the force of drag ($F_d$), and the buoyancy ($F_b$). Then, when the terminal velocity is reached, the settling velocity of the particle becomes asymptotic to a constant value with the net acceleration equal to 0. From the above statements, it can be deduced that:

$$F = F_e - F_b - F_d, \tag{6a}$$

$$F = m\frac{dV}{dt}, \tag{6b}$$

$$F_e = ma_e, \tag{6c}$$

$$F_b = \frac{m\rho_f a_e}{\rho_p}, \text{ and} \tag{6d}$$

$$F_d = \frac{C_D A_p \rho_f V^2}{\rho_p}. \tag{6e}$$

When the net acceleration equals 0, the terminal velocity ($V_t$) is obtained from Equation (7) as follows:

$$V_t = \left(\frac{2g(\rho_p - \rho_f)}{A_p \rho_P C_D \rho_f}\right)^{1/2}, \tag{7}$$

where $A_p$, $\rho_p$, $\rho_f$, and $C_D$, are the surface area of the particle, density of the particle, density of the fluid, and the drag coefficient, respectively.

Then, for a spherical particle of diameter $D_p$, the terminal velocity is given by Equation (8) according to the following:

$$V_t = \left(\frac{4gD_p(\rho_p - \rho_f)}{3C_D\rho_f}\right)^{1/2}. \tag{8}$$

For the case of creeping flow (i.e., flow at low velocities relative to the sphere), the drag force $F_d$ on the particle can be obtained through the Navier-Stokes equations. For $R_{ep}<1$, the drag force ($F_d$), the drag coefficient ($C_D$), and, hence, the terminal velocity ($V_t$) are obtained from Equations (9), (10), and (11), respectively, as follows:

$$F_d = 3\pi\mu V_t D_p, \tag{9}$$

-continued $$C_D = \frac{24}{R_{ep}}, \text{ and} \tag{10}$$

$$V_t = \frac{gD_p^2(\rho_p - \rho_f)}{18\mu_f}. \tag{11}$$

For a power law fluid in the Stokes' law range, the particles Reynolds number ($N_{Rep}$) is calculated from the average settling velocity ($\overline{V}_{STH}$) according to the following:

$$R_{ep} = \frac{\rho_f \overline{V}_{STH}^{2-n} D_p^n}{K}, \tag{12}$$

where K and n are the flow parameters obtained from the Power Law rheological model.

The hindered settling velocity ($V_{STH}$) is calculated from the terminal velocity of a single particle (Vi) as follows:

$$V_{STH} = V_t(v)^\omega, \tag{13}$$

where ν and ω are the void fraction and system specific exponent, respectively.

Example 3: Computational Methodology: CFD Modeling and Simulation of Barite Segregation Drilling fluids are colloidal suspensions comprised of solid particles suspended in a continuous liquid phase. The flowing suspensions of particles in a liquid have been known to exhibit particle migration even in creeping flow and in the absence of significant nonhydrodynamic or gravitational effects. When subjected to the action of a moving fluid, particles experience various settling characteristics, which are induced by gradients in shear rate, concentration, and relative viscosity. From these perspectives, a constitutive model, referred to as the diffusive flux model, was generated for the evolution of particle concentration in a flowing suspension. Accordingly, in prior art, a continuum constitutive equation based on the diffusive flux using the finite element method (FEM) was applied to examine the performance of suspended particles both in batch sedimentation and in shear between concentric rotating cylinders. Numerical results were complemented with experimental data of batch sediment and those of two-dimensional (2D) nuclear magnetic resonance (NMR) imaging measuring the evolution of solid fraction profiles in the same suspension undergoing flow between rotating concentric cylinders.

Drilling fluid is a multiphase flow involving liquid and solid. The presence of different phases is described using the volume fractions. Interphase effects, such as surface tension, buoyancy, and transport across phase boundaries, are treated using the dispersed multiphase flow models. Numerical modeling adopted in the COMSOL Multiphysics uses a macroscopic two-phase model in which volume fractions of the phases are tracked. The mixture model based on the diffusive flux is set up in the laminar flow interface. The mathematical model comprises a set of partial differential equations including the momentum transport equation for the mixture (Equation (14)), a continuity equation (Equation (15)), and a transport equation for the solid phase volume fraction (Equation (16)) as follows:

$$\rho\frac{\partial j}{\partial t}+\rho(j\cdot\nabla)j=-\nabla P-\nabla\cdot(\rho c_p(1-c_p)u_{slip}u_{slip})+\nabla\cdot\mu\left[\left(\nabla j+\nabla j^T\right)\right]+\rho g, \tag{14}$$

where j is the volume-averaged mixture velocity, P is the pressure, $c_p$ is the dimensionless particle mass fraction, g is gravitational acceleration (m/s$^2$) and $u_{slip}$ is the relative velocity between the solid and the liquid phases.

The continuity equation for the mixture model is given as follows:

$$(\rho_f-\rho_p)[\nabla\cdot(\phi_p(1-c_s)u_{slip})]+\rho_f(\nabla\cdot u)=0, \tag{15}$$

where $\rho_f$ and $\rho_p$ are the densities of the fluid and solid phase (particle), respectively. The solid phase volume fraction is denoted by $\varnothing_p$. The transport equation for the solid phase volume fraction is given as follows:

$$\frac{\partial}{\partial t}(\rho_p\phi_p)+\nabla\cdot(\rho_p\phi_p u_p)=0. \tag{16}$$

The solid phase velocity ($u_p$), the relative velocity ($u_{slip}$), and the particle flux ($j_p$) were defined as follows (Equations 17-19):

$$u_p=u+(1-c_S)u_{slip}, \tag{17}$$

$$u_{slip}=\frac{j_p}{\phi_p\rho_p(1-c_s)}, \tag{18}$$

$$\frac{j_p}{\rho_p}=-\left[\phi D_\phi\nabla(\dot{\gamma}\phi)+\phi^2\dot{\gamma}D_n\nabla(\ln\mu)\right]+f_hV_t\phi, \tag{19}$$

where $D_\varphi$ and $D_n$ are empirically fitted parameters. $V_t$ and $f_h$ are the settling velocity and hindering functions, respectively.

The density ($\mu_m$) of the mixture was calculated using a simple mixing rule (Equation 20) as follows:

$$\rho_m=(1-\phi_p)\rho_f+\phi_p\rho_p. \tag{20}$$

The viscosity ($\mu_m$) was calculated using the Krieger-Dougherty derived empirical correlation (Equation 21) according to the following:

$$\mu_m=\mu_f\left(1-\frac{\phi_p}{\phi_m}\right)^{-2.5\phi_m}, \tag{21}$$

where $\mu_f$ is the fluid's viscosity, and $\varnothing_m$ is a maximum packing concentration.

Figure 16:
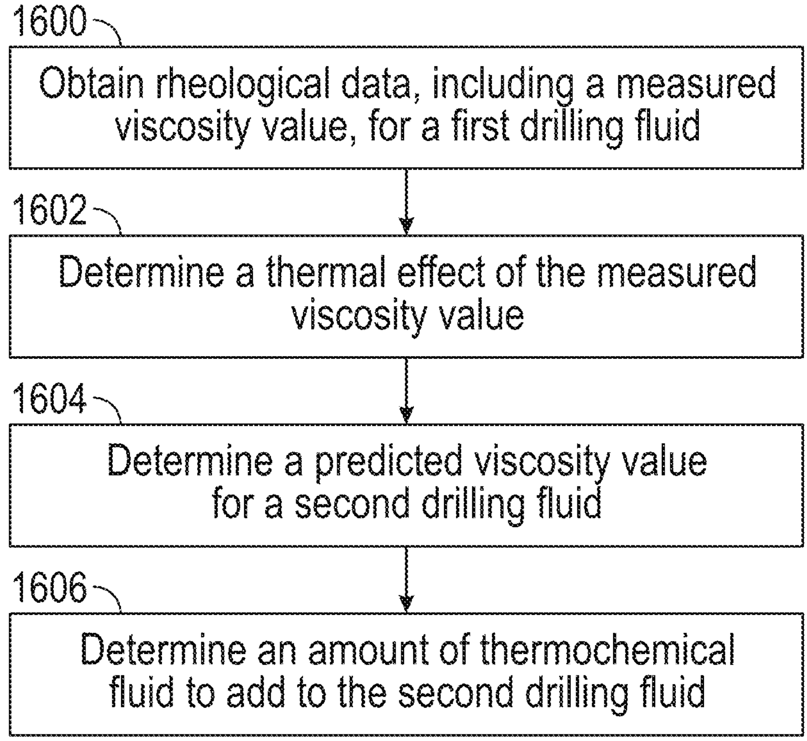
FIG. 16 is a flow diagram illustrating a method for mitigating particle sagging in water-based drilling fluids according to one or more embodiments of the present disclosure.

The solution of these equations describes the dynamics of the system. The multiphysics involves coupled laminar flow and phase transport interfaces. The equations were discretized using the finite element method in the multiphase mixture model of COMSOL software developed by COMSOL, Inc. located at 100 District Avenue, Burlington, MA 01803. In addition, the shear rate was discretized in order to improve accuracy due to incorporation of its derivatives in the particle flux, which in turn depends on the derivatives of the velocity. A 2D computational domain (Couette device) with user controlled triangular meshing was used as provided in the software. The mesh parameters comprise the minimum and maximum element size of approximately 0.0000203 m and approximately 0.0012 m, respectively. The model follows various assumptions including taking the initial values of velocity fields as well as pressure as zero (0), non-slip walls conditions, approximately constant density of each phase (i.e., incompressible flow), and that the solid particle is spherical. A physics-controlled time-dependent solver was used to solve the partial differential equations. To handle the convergence errors, which might occur when solving non-Newtonian viscosity model (such as power law) due to nonlinearities, a number of procedures may be taken, such as updating the Jacobian on every iteration, changing the maximum number of iterations to higher value, and adjusting the tolerance factor. A simplified process flow diagram, which was followed in executing the simulation is depicted in FIG. 16. Table 1 below lists exemplary simulation parameters for the simulation of oil-based mud (OBM), oil-based mud with thermochemical fluid (OBM_TCF), WBM, and WBM_TCF.

TABLE 1

Simulation Parameters

| | OBM | OBM_TCF | WBM | WBM_TCF |
|---|---|---|---|---|
| Density of particle: barite (kg/m$^3$) | 4200 | 4200 | 4200 | 4200 |
| Density of fluid (kg/m$^3$) | 828 | 764 | 1100 | 1045 |
| Particle radius (m) | 2.50E−05 | 2.50E−05 | 3.00E−05 | 3.00E−05 |
| Particle sphericity | 1 | 1 | 1 | 1 |
| Initial values | | | | |
| Velocity (m/s); x, y | 0 | | | |
| Pressure (Pa) | 0 | | | |
| RPM (min$^{-1}$) | 3; 6; 10; 100; 300 | | | |
| Rotation time (min) | 60 | | | |

Figure 2A:
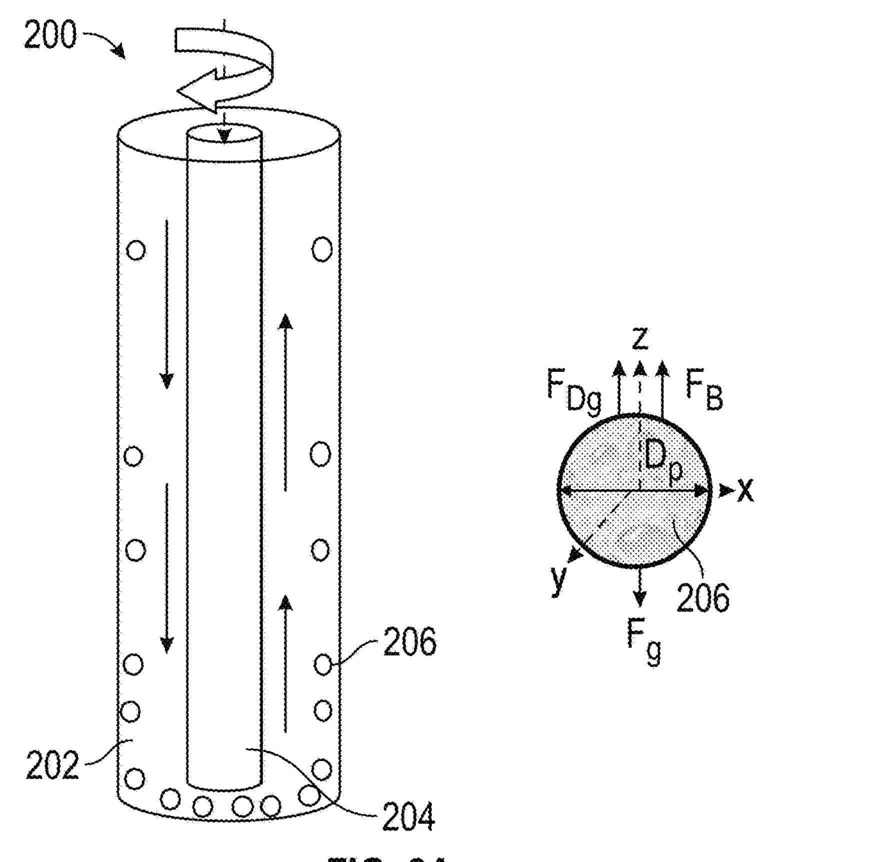
FIG. 2A illustrates a three-dimensional (3D) Couette device consisting of two coaxial cylinders according to one or more embodiments of the present disclosure.
Figure 2B:
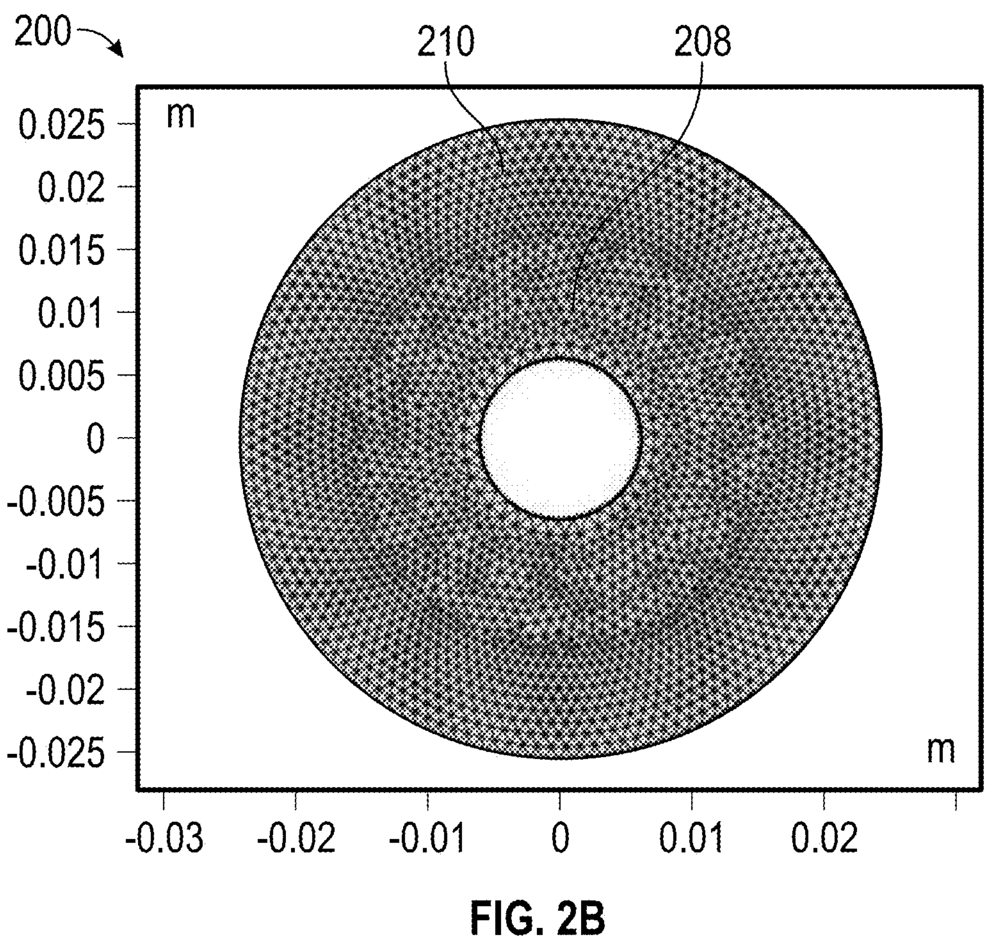
FIG. 2B illustrates a two-dimensional (2D) meshed Couette device according to one or more embodiments of the present disclosure.
Figure 2C:
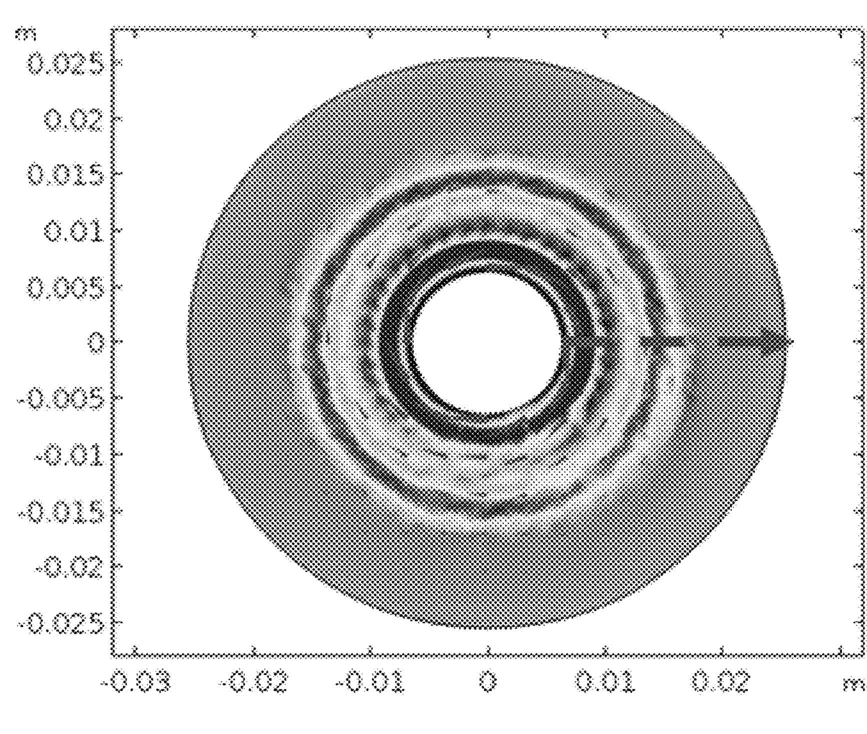
FIG. 2C illustrates a 2D diagram of the Couette device showing the section through which the parameters were analyzed according to one or more embodiments of the present disclosure.

CFD analysis may be used for predicting the viscosity characteristics and for verification depending on the nature of the problem. FIGS. 2A-2C depict the computational flow geometry used in the CFD analysis. The flow geometry is comprised of two concentric cylinders in which the inner cylinder rotates while the outer one is fixed, as shown in FIG. 2A. The geometry is essentially a Couette device (200), or Couette viscometer, for the flow of a viscous fluid in the space between two coaxial cylinders (202) and (204), one of which is moving tangentially relative to the other. The Couette device 200 may be used for measuring the viscosity of a fluid between the two coaxial cylinders 202 and 204. In the embodiment shown in FIG. 2A, the fluid is a drilling mud having barite particles 206 distributed therein.

FIG. 2B depicts a 2D illustration of a meshed Couette device 200. The meshed Couette device 200 comprises an inner cylinder 208 and an outer cylinder 210. The radii of the inner cylinder 208 and the outer cylinder 210 may be any suitable value provided that the radius of the inner cylinder 208 is less than the radius of the outer cylinder 210. For instance, the radius of the inner cylinder 208 may be between 0.0064 meters (m) and 0.25 m, such as 0.0064 m. The radius of the outer cylinder may be between 0.020 m and 1, such as 0.0254 m. FIG. 2C is a 2D diagram of the Couette device 200 illustrating the section of the flow geometry in which the particle segregation parameters were analyzed. The flow of the fluids is induced by relative motion of the two surfaces, which imposes a shear stress on the fluid. FIG. 2C shows the section through which the parameters were analyzed, where the different shaded regions represent concentration distributions of particles.

Example 4: Rheological Characteristics of Drilling Fluids

Figure 3:
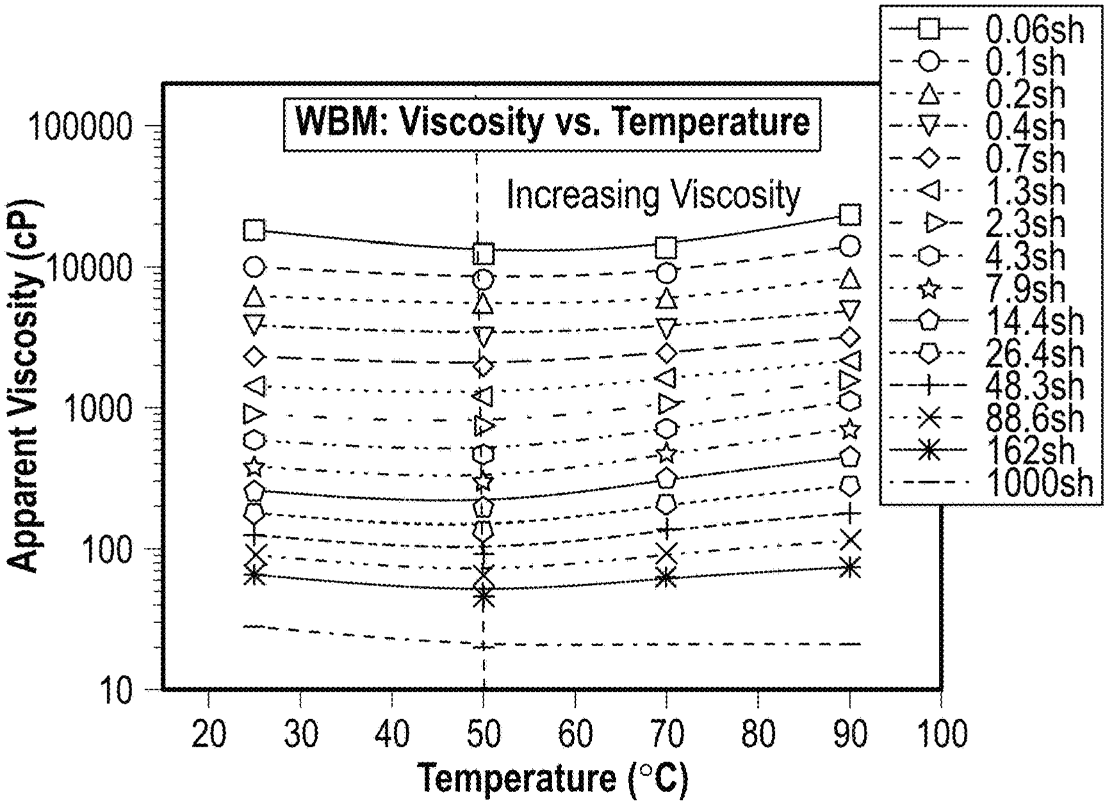
FIG. 3 is a plot illustrating apparent viscosity versus temperature of water-based mud (WBM) at different shear rates according to one or more embodiments of the present disclosure.

The relationship between viscosity (y-axis) and temperature (x-axis) of conventional water-based mud (WBM) is presented in FIG. 3. As shown, the viscosity of the WBM decreases with increasing temperature between 25° C.-50° C. However, the viscosity tends to increase after 50° C. and up to 90° C. at all shear rates. The behavior may be due to a decrease in stability of the WBM at higher temperatures. Furthermore, it has been observed that the reduction in viscosity due to shear rates is more pronounced at the lower shear rates (e.g., 0.06 $s^{-1}$-0.7 $s^{-1}$) compared with the shear rates above 1 $s^{-1}$, at all temperatures. It is expected that the viscosity of colloidal dispersions, such as drilling fluids, may become less sensitive to shearing force or temperature due to increased homogeneity.

Figure 4:
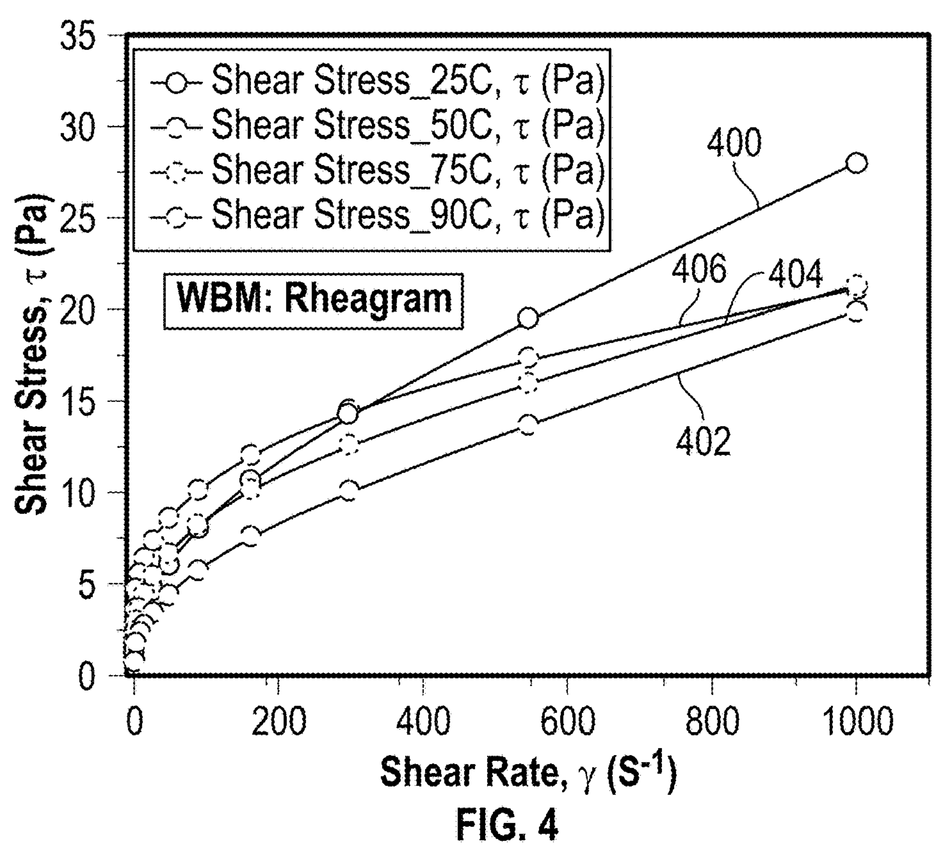
FIG. 4 illustrates a rheogram of oil-based mud (OBM) at different temperatures according to one or more embodiments of the present disclosure.
Figure 5:
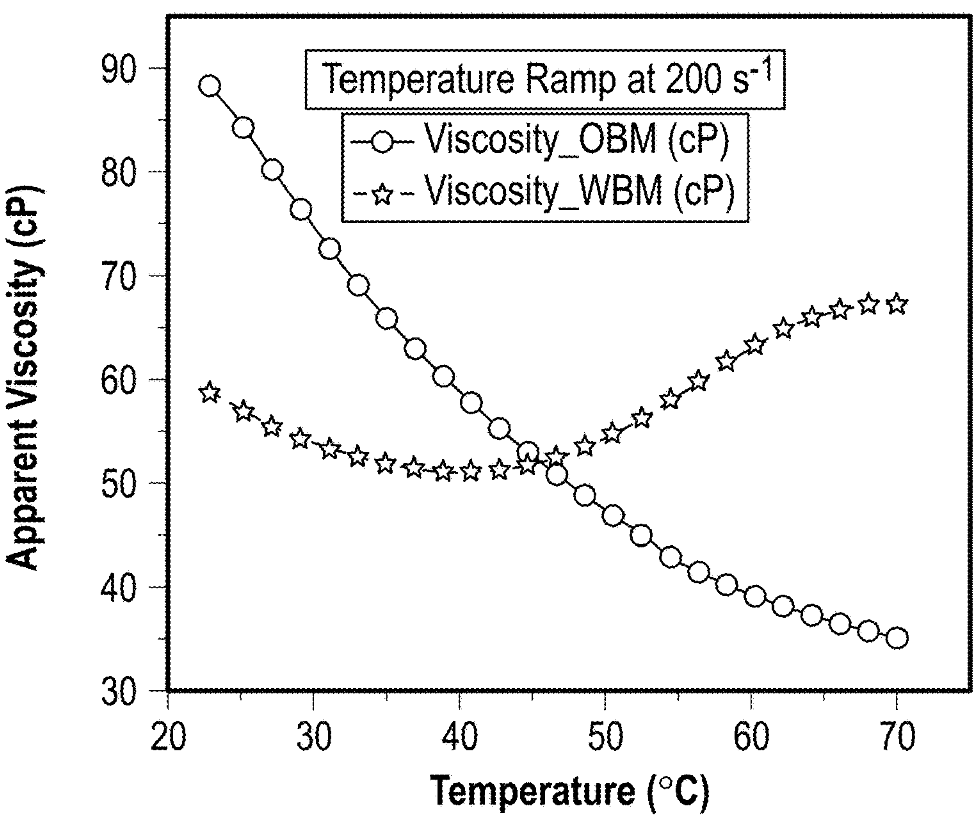
FIG. 5 illustrates apparent viscosity of OBM and WBM at constant shear rate and different temperatures according to one or more embodiments of the present disclosure.

A rheogram of oil-based mud (OBM) at different temperatures is presented in FIG. 4, showing that the shear stress (y-axis) increased with the rate of shearing (x-axis), between 25° C. (400) and 50° C. (402) and from 70° C. (404) to 90° C. (406). The observed increase is consistent with the viscosity-temperature behavior explained previously and depicted in FIG. 3. To further support the above observations, the temperature ramp test was performed for the fluids at constant shear rate (200 $s^{-1}$). In accordance with the temperature response discussed, FIG. 5 shows that the apparent viscosity of OBM decreases with increasing temperature. On the other, closely related to the observation earlier presented, the apparent viscosity of WBM increased significantly after 50° C.

Example 5: Thermal Effect: Assessment of Rheological Characteristics of WBM_TCF As presented in U.S. application Ser. No. 17/721,061, the WBM_TCF formulations show similar rheological characteristics to the WBM, such as below the 70° C. activation temperature. However, after activation, the fluids are expected to exhibit rheological behavior consistent with those of the conventional base drilling fluids (WBM) at higher temperatures (above 70° C.).

The rheological characteristics of the WBM_TCF were assessed using Equation 5 with the assumption of the temperature change of the TCF reaction shown in FIG. 1. The properties of the WBM_TCF were obtained at 120° C. The estimated rheological parameters are presented in Table 2 below. The data presented in the table are consistent with the viscosity-temperature trend displayed in FIGS. 3-5. Specifically, the data show that the shear-independent viscosity (K), otherwise known as the flow consistency index, decreased between 25° C. and 50° C. and increased afterwards (from 70° C.-120° C.) for the WBM_TCF. In addition, the calculated flow activation energy $E_\alpha$ was found to be negative for the WBM_TCF, since the flow consistency index increased at higher temperatures.

TABLE 2

| Rheological Parameters of the Drilling Fluids WBM_TCF | | | | | |
|---|---|---|---|---|---|
| T(° C.) | $N_{Rep}$ | K | n | Ko | Ea |
| 25 | 1.7E−12 | 1591 | 0.13 | 12726 | −5302 |
| 50 | 4.6E−12 | 1621 | 0.27 | | |
| 70 | 3.8E−12 | 1911 | 0.29 | | |
| 90 | 9E−13 | 2347 | 0.18 | | |
| *120 | 6E−13 | 3408 | 0.20 | | |

Figure 6:
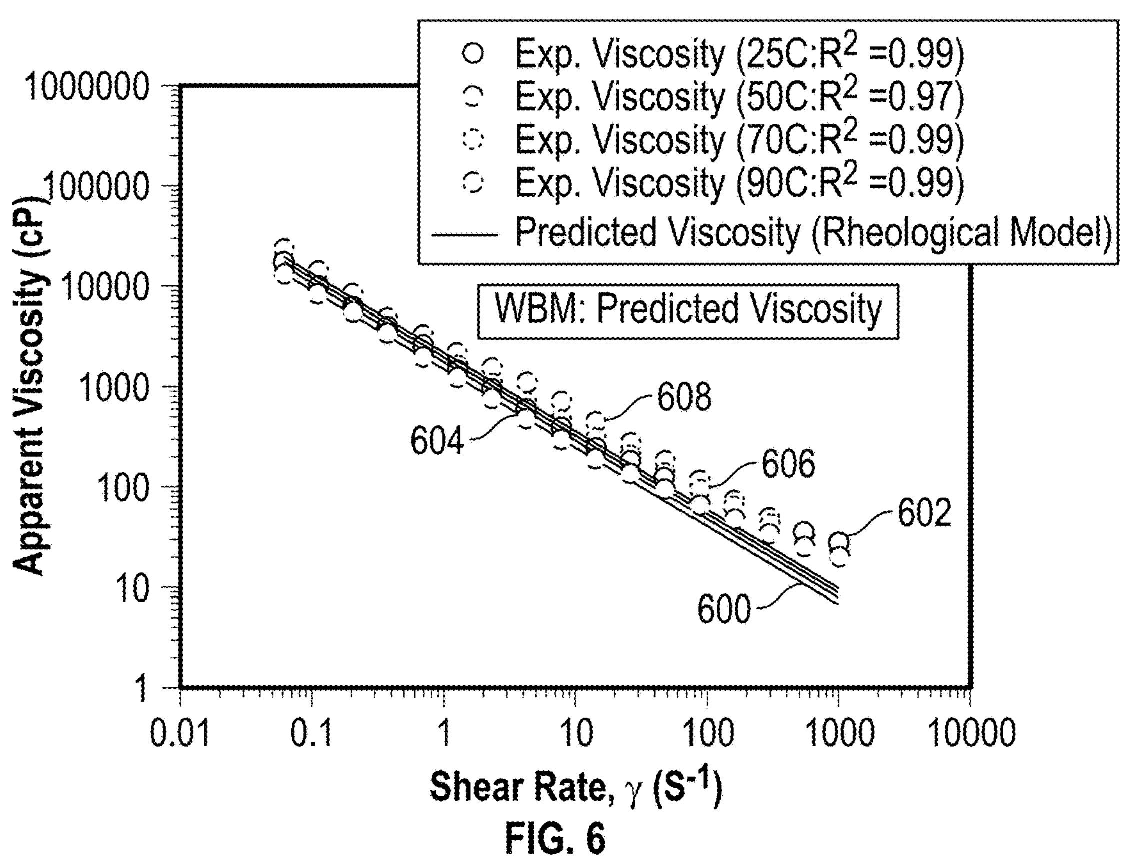
FIG. 6 illustrates predicted apparent viscosity of WBM versus shear rates at different temperatures based on thermal effect using Equation 5 according to one or more embodiments of the present disclosure.

As shown in FIG. 6, the lines, such as line (600), represent the predicted viscosities determined based on the rheological data obtained using Equation 5. Data points (602) represent experimental viscosity values at 25° C.; data points (604) represent experimental viscosity values at 50° C.; data points (606) represent experimental viscosity values at 70° C.; and data points (608) represent experimental viscosity values at 90° C. As evident in FIG. 6, the viscosities of the fluids may be adequately predicted based on the thermal effect on the viscosity using Equation 5.

Example 6: Gravitational Settling Characteristics of Barite Particles Using Stokes Law The terminal settling velocity $V_t$ is a characteristic of particles suspended in a colloidal system. The $V_t$ depends on the liquid properties, such as density and viscosity, and on particle properties, including diameter, density, and shape. However, due to collisions between particles and between particles and the wall, the hindered settling velocity becomes effective. The hindered settling velocities $V_{STH}$ of the barite particles in the drilling fluids at different temperatures are compared in FIG. 7. Curve (700) represents WBM at 25° C., curve (702) represents WBM at 50° C., curve (704) represents WBM_TCF at 70° C., curve (706) represents WBM_TCF at 90° C., and curve (708) represents WBM_TCF at 120° C. $W_{f1}$ and $W_{f2}$ represent the behaviors of the WBM and WBM_TCF, respectively.

Figure 7:
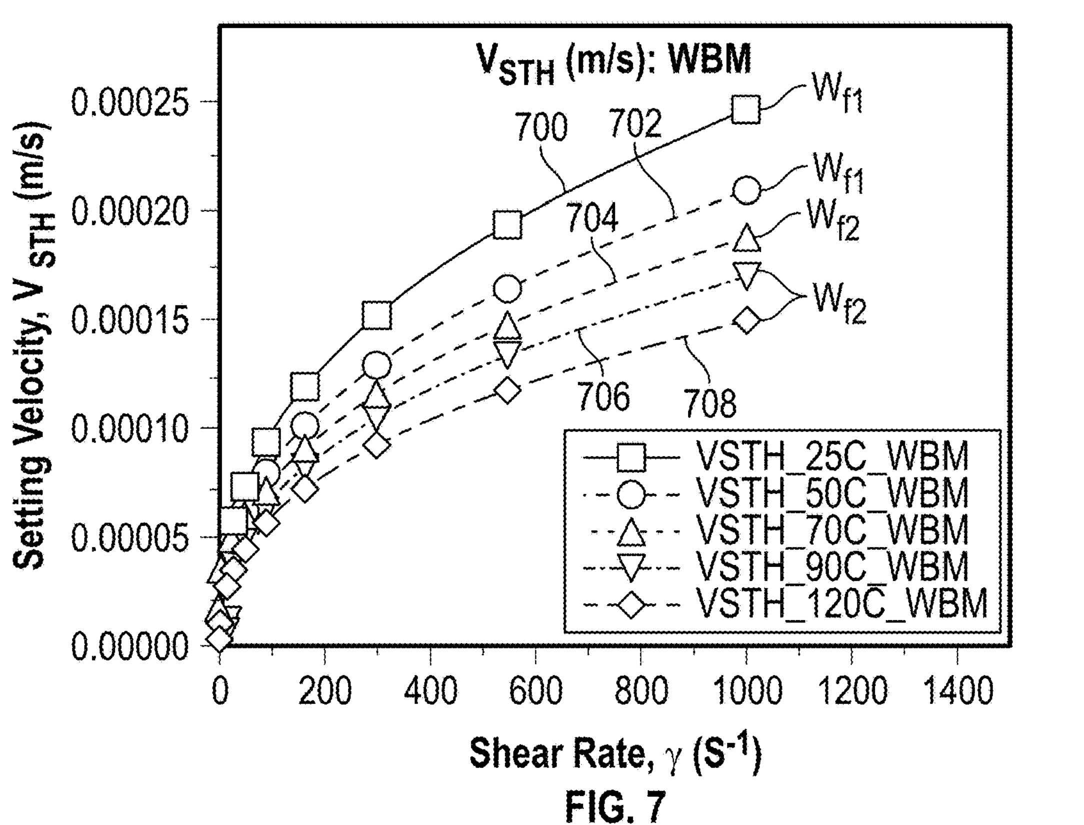
FIG. 7 illustrates the Reynolds number and the hindered settling velocity of the Barite particles at different temperatures according to one or more embodiments of the present disclosure.

As shown, for both fluids, the $V_{STH}$ increases with increasing shear rates because the fluids are non-Newtonian and shear thinning with the apparent viscosity decreasing with the shear rates. However, inconsistent with the thermal effect of the rheological characteristics, the $V_{STH}$ decreased with increasing temperatures for the WBM due to the thermal effect which makes the viscosity of WBM tend to increase with increasing temperatures, notably, at 70° C.-120° C. The decrease in settling velocity is possibly an indication of lower barite sagging potential in WBM, as the temperature increases above 70° C. At higher temperatures 70° C.-120° C., the WBM has reduced settling velocity. In order words, it may be inferred from these observations that the newly formulated drilling fluid, WBM_TCF, may exhibit lower sagging potential of barite particles since the viscosity increases as the temperature increases from 70° C.-120° C. The overall observations depicted in FIG. 7 is consistent with the particle Reynolds number ($N_{Rep}$) presented in Table 2.

Example 7: CFD Analysis of Mass Fraction and Particle Flux Distributions

Complex flow profiles may arise from a balance of gravitational flux on the particles, which may lead to segregation. Shear-induced migration may cause remixing when particles are subjected to the action of a moving fluid.

In other words, the particles experience both buoyancy and the shear induced effects. Under the typical condition, it has been experimentally and theoretically shown that the downward gravitational particle flux is balanced by a corresponding upward flux due to shear-induced particle diffusion.

Figure 8A:
FIG. 8A illustrates a 2D diagram showing distribution of mass fraction of Barite particles at different rotation rates at an initial time according to one or more embodiments of the present disclosure.
Figure 8B:
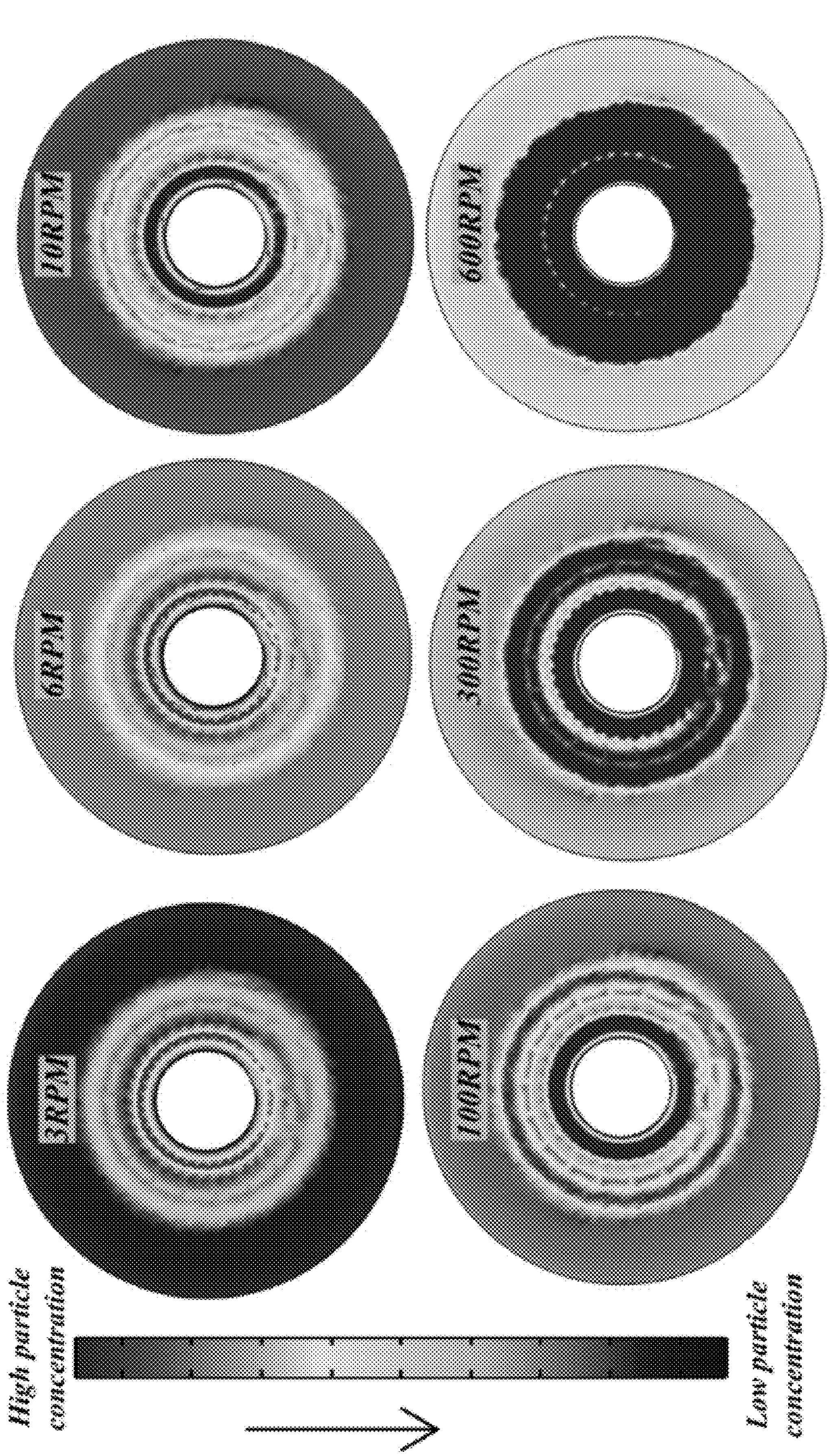
FIG. 8B illustrates a 2D diagram showing distribution of mass fraction of Barite particles at different rotation rates after one hour according to one or more embodiments of the present disclosure.

FIG. 8A is a 2D diagram showing the general distribution of mass fraction of the dispersed barite particles at different rotational speeds (3-600 revolutions per minute (RPM)) at initial time (t)=0. High particle concentration may be observed at the top of the device. FIG. 8B is a 2D diagram showing general distribution of mass fraction of barite particles at different rotation rates after 1 hour. Essentially, the concentration of particles dispersed increases as the pipe rotation rate speed increases and becomes more intense with time. In addition, it may be observed that the heavier barite particles tend to move towards the center of rotation in all cases. Due to shear induced migration and buoyancy, it is expected for flow in a Couette geometry that the particles migrate to the region away from the center of rotation, which experiences a higher rate of rotation, to regions away from the center where mixing of bulk fluid is less intense. However, as shown in FIG. 8B, the denser barite particles tend to move towards the center, as a lower concentration of particles is observed at the region away from the center of rotation.

The detailed numerical information of the mass fraction distribution is presented in one-dimensional (1D) plots in FIGS. 9A, 9B, 10A, and 10B. As explained previously, the FIGS. 8A and 8B showed that the dispersed mass fraction increased with the pipe rotation rate. It may also be observed that the magnitude of mass fraction initially increased from the edge of the geometry, reached a maximum value at the center, and decreased afterwards. Specifically, the mass distribution patterns for the WBM and the WBM_TCF are presented in FIGS. 9A-9B and FIGS. 10A-10B, respectively.

Figure 9A:
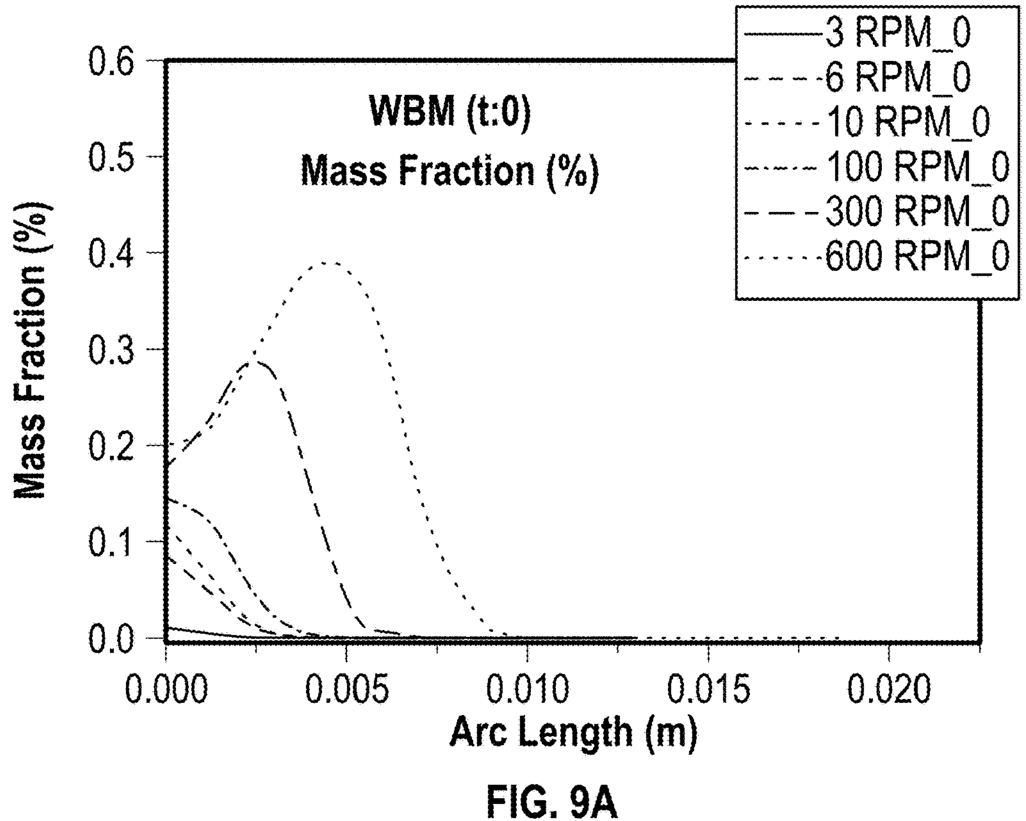
FIGS. 9A and 9B illustrate distributions of mass fraction of Barite particles segregated at different rotation rates for WBM according to one or more embodiments of the present disclosure.
Figure 9B:
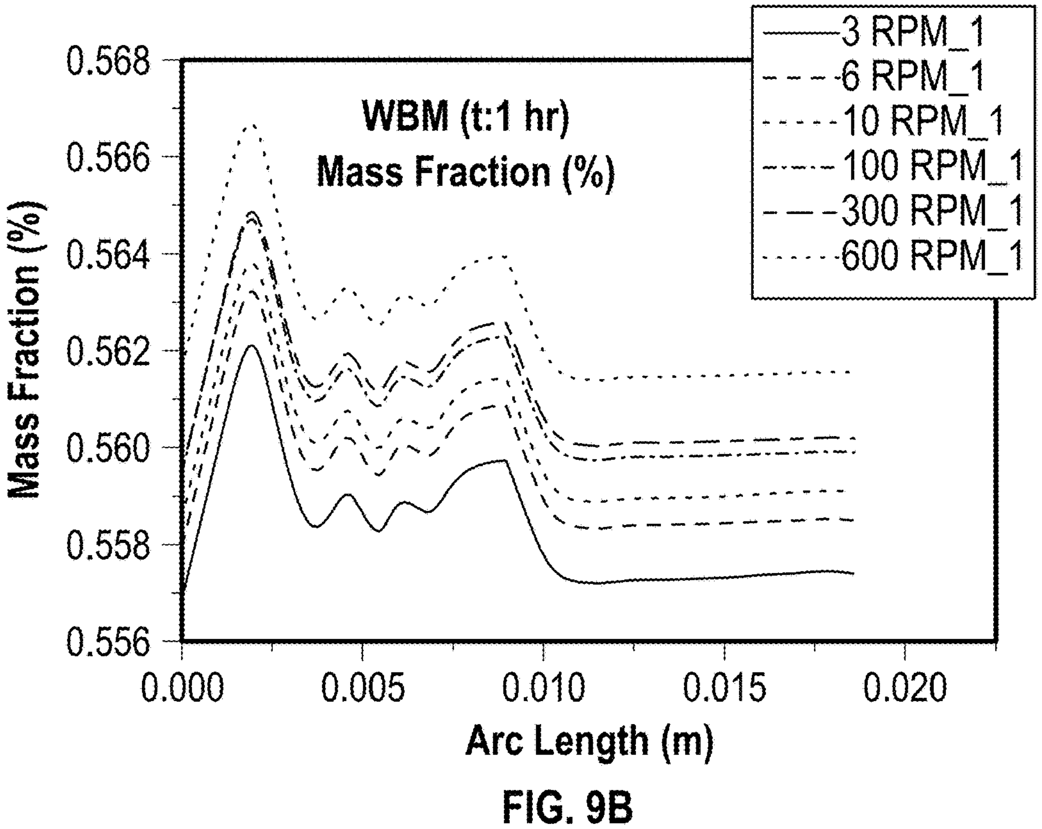
Figure 10A:
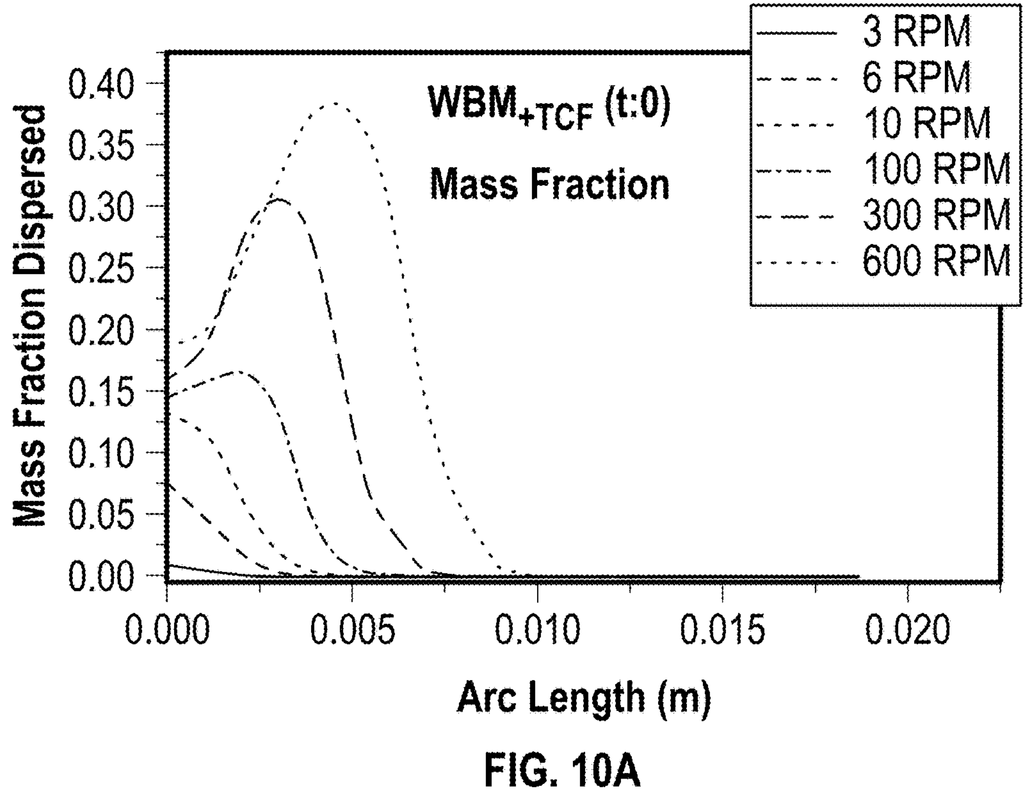
FIGS. 10A and 10B illustrate distributions of mass fraction of Barite particles segregated at different rotation rates for WBM with thermochemical fluid (WBM_TCF) according to one or more embodiments of the present disclosure.
Figure 10B:
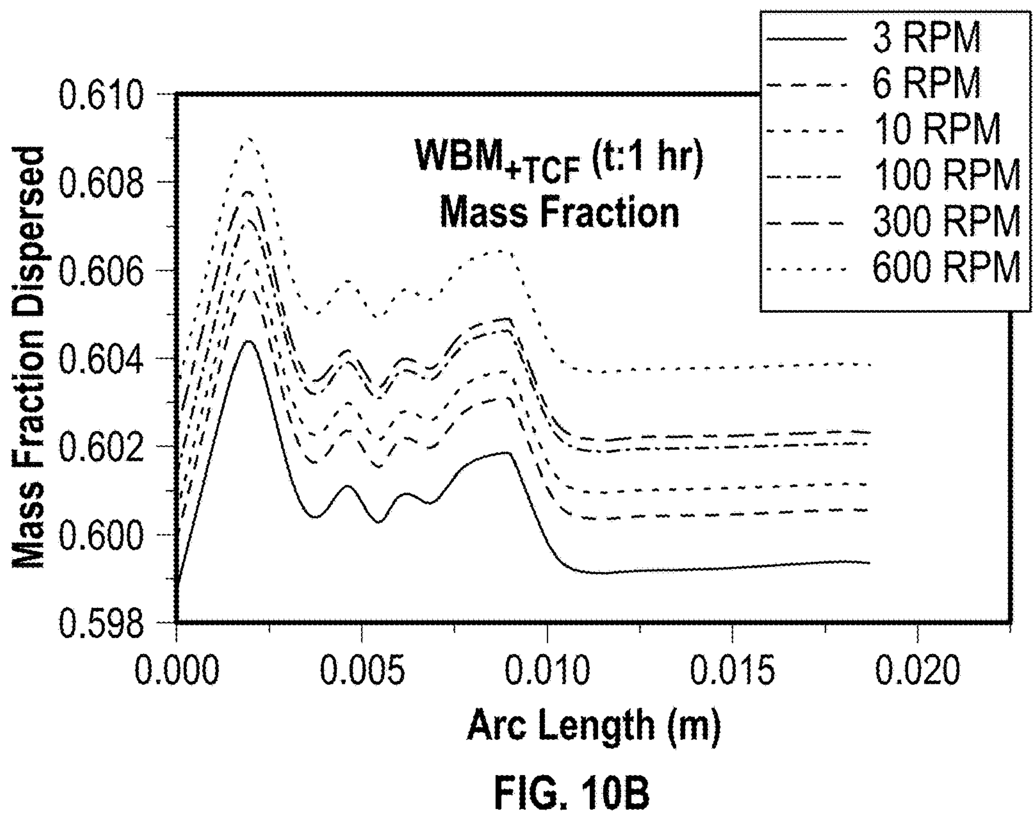

FIG. 9A illustrates that, at t=0, the WBM exhibits a similar mass fraction distribution (maximum value of 0.39 at 600 RPM) to the WBM_TCF in FIG. 10A. FIG. 9B shows the mass fraction distribution for WBM at one hour. When comparing FIG. 9B with the WBM_TCF at one hour in FIG. 10B, the WBM_TCF has the highest value of mass fraction of approximately 0.601. This observation may be reasonably linked with the rheological characteristics of the WBM_TCF and the response of its viscosity to shear rates at higher temperatures. Similarly, it may be inferred from the mass fraction distribution patterns that the WBM_TCF exhibits lower sagging potential of barite particles since the viscosity increases as the temperature increases from 70° C.-120° C.; hence, more particles are carried in the liquid phase.

Figure 11A:
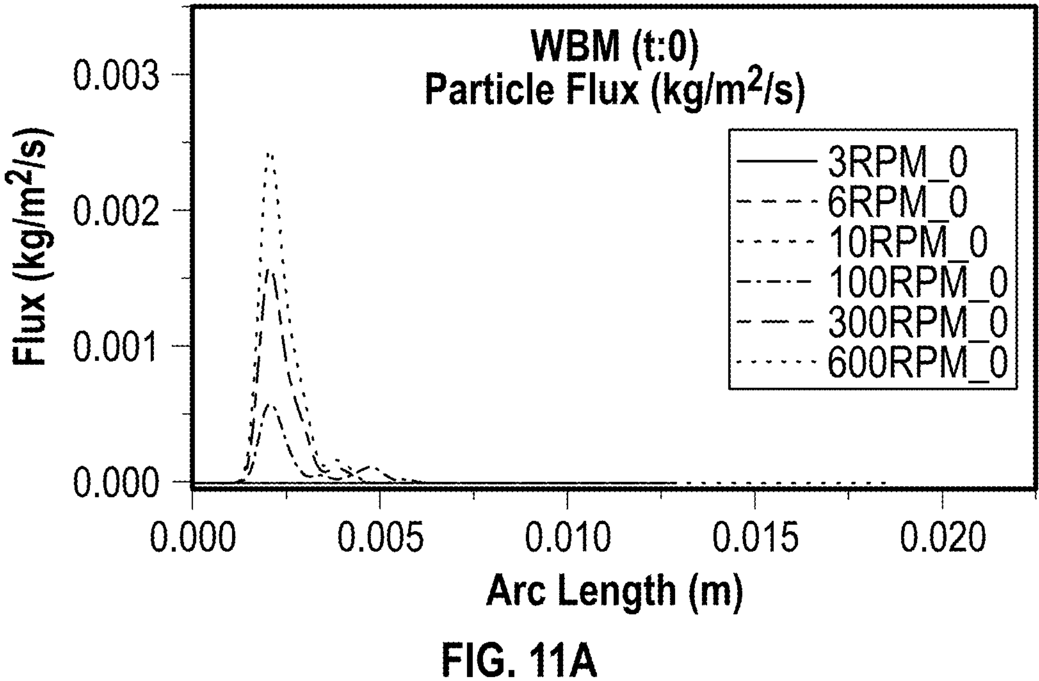
FIGS. 11A and 11B illustrate barite particle flux distributions at different rotation rates for WMB according to one or more embodiments of the present disclosure.
Figure 11B:
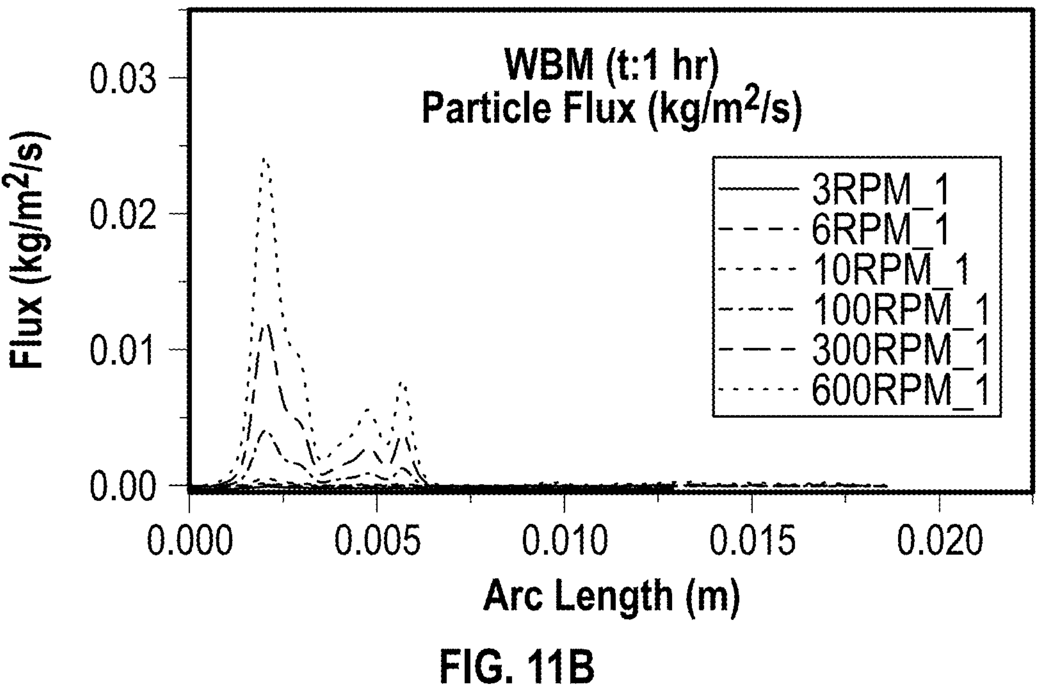
Figure 12A:
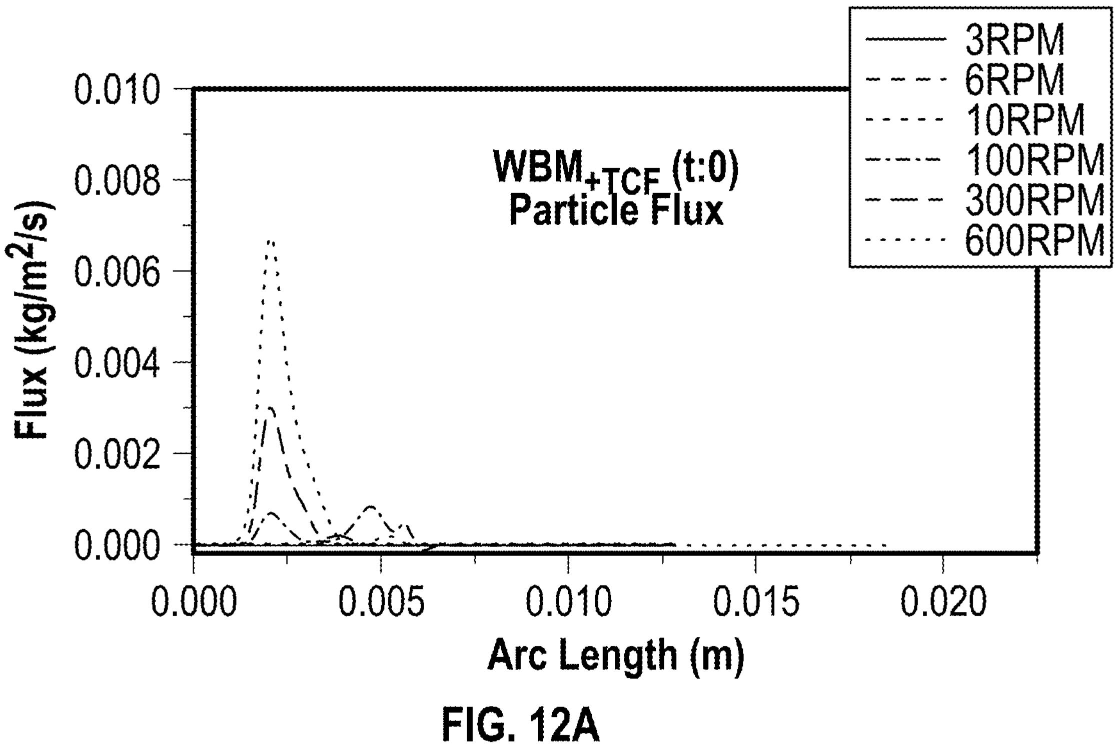
FIGS. 12A and 12B illustrate barite particle flux distributions at different rotation rates for WBM_TCF according to one or more embodiments of the present disclosure.
Figure 12B:
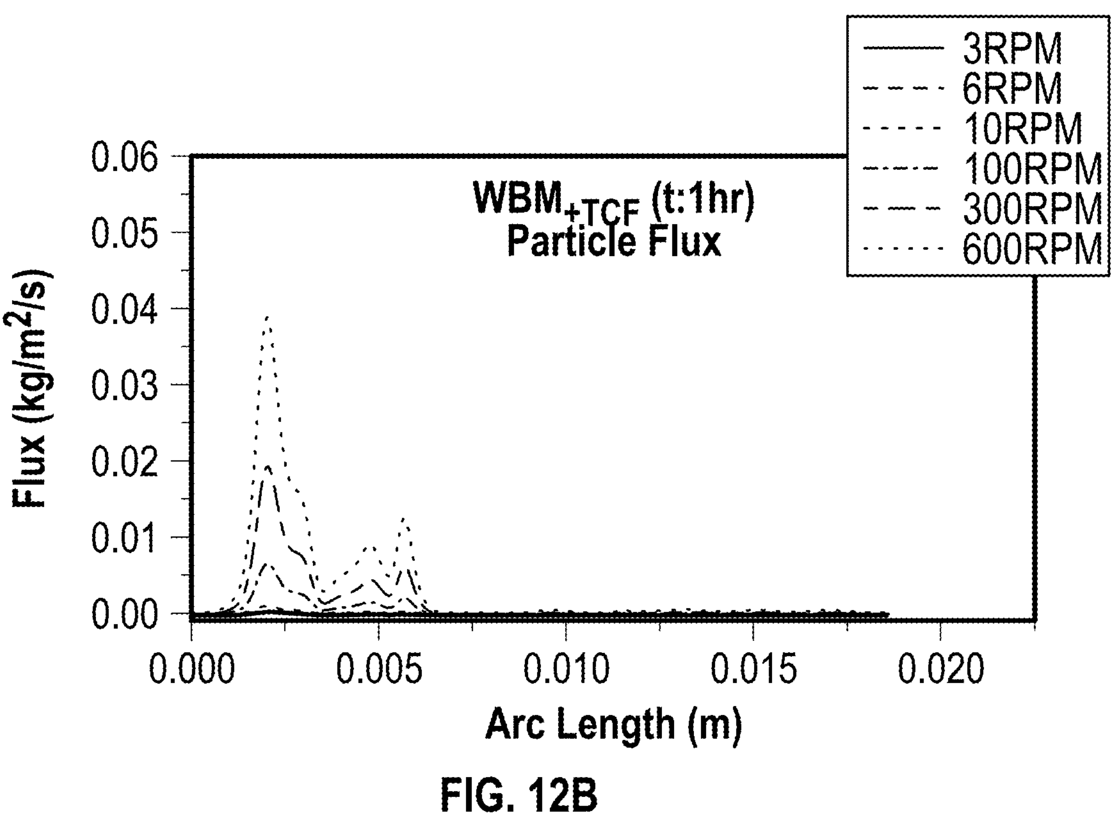

Particle migration has been reported to be induced by three factors including gradients in shear rate, concentration, and relative viscosity. The three factors have been referenced as a basis for developing a diffusive flux model, which has been employed in the viscous resuspension phenomenon. The flux of dispersed barite particles is presented in FIGS. 11A-11B and FIGS. 12A-12B. Specifically, FIGS. 11A and 11B illustrate barite particle flux distributions at different rotation rates for WMB at t=0 and t=1 hour. FIGS. 12A and 12B illustrate barite particle flux distributions at different rotation rates for WMB_TCF at t=0 and t=1 hour. FIGS. 11A-12B show that the particle flux increases with the pipe rotation rate (RPM) and time. In addition, there is a possibility of higher flux at the region close to the axis of rotation within the geometry compared to the region far away from the axis of rotation, where the flux is the same and flattens out regardless of the rotation rates. Furthermore, WBM_TCF (FIGS. 12A and 12B) has higher particle flux compared with the WBM (FIGS. 11A and 11B).

Example 8: CFD Analysis of Viscosity Distribution and Pressure Drop

Figure 13A:
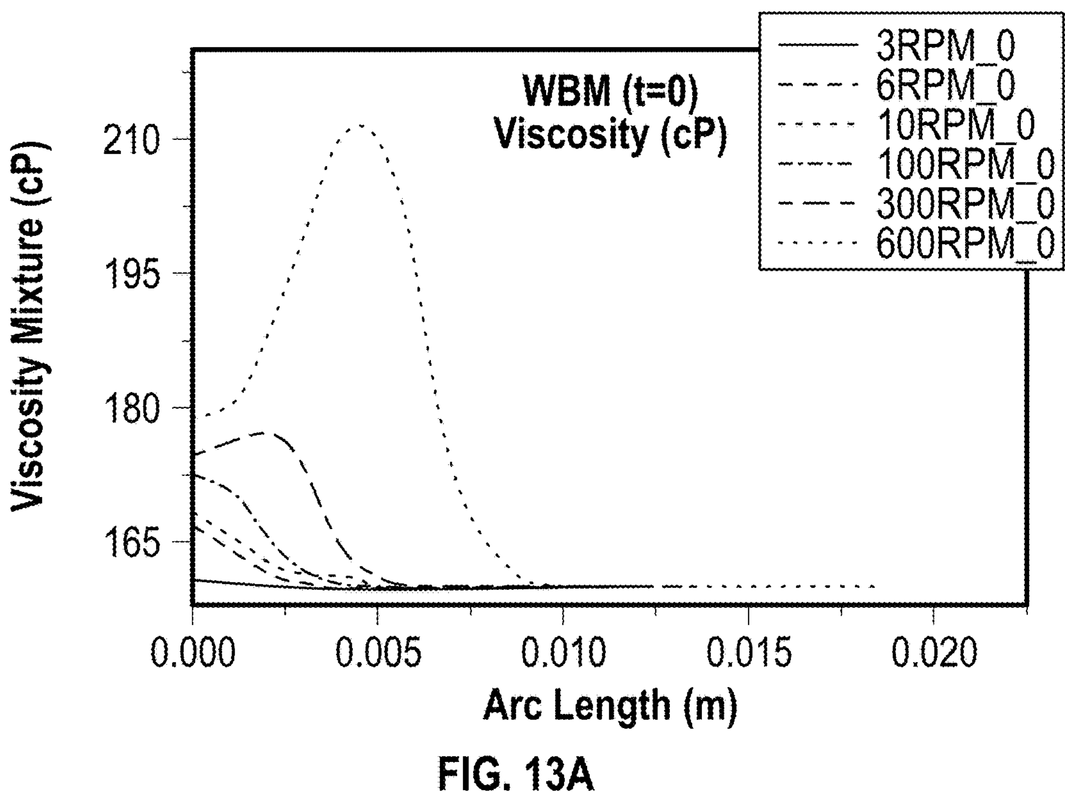
FIGS. 13A and 13B illustrate viscosity distributions at different rotation rates for WBM according to one or more embodiments of the present disclosure.
Figure 13B:
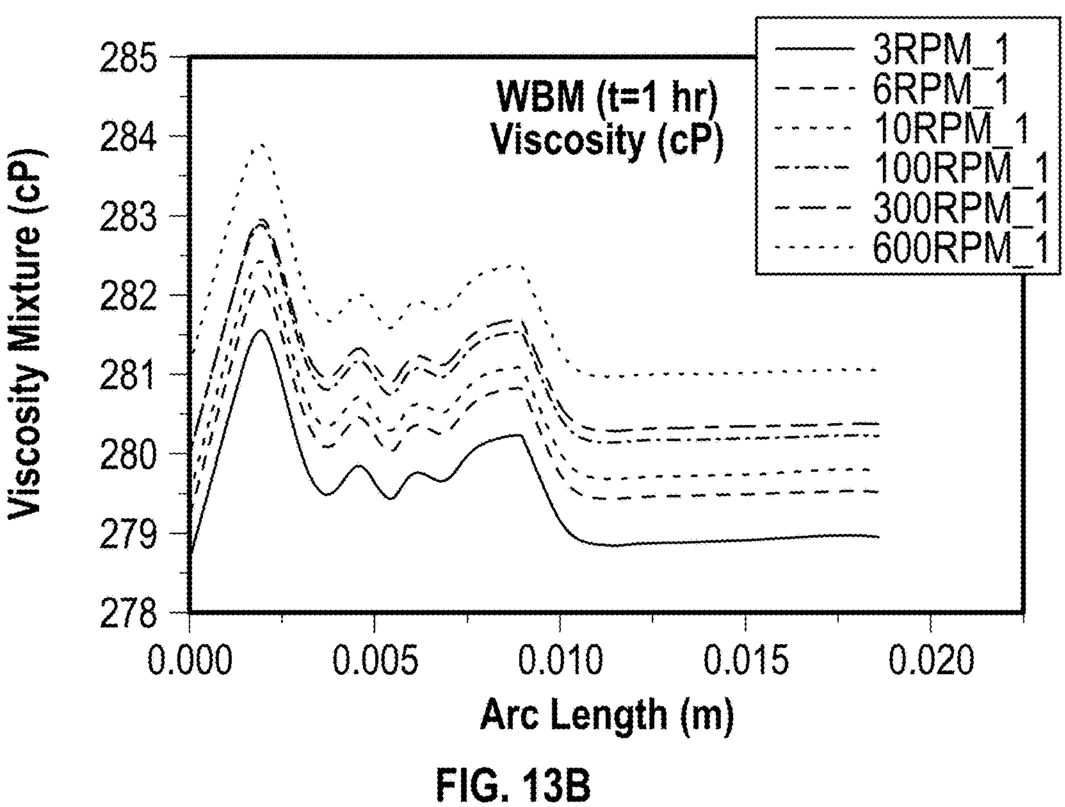
Figure 14A:
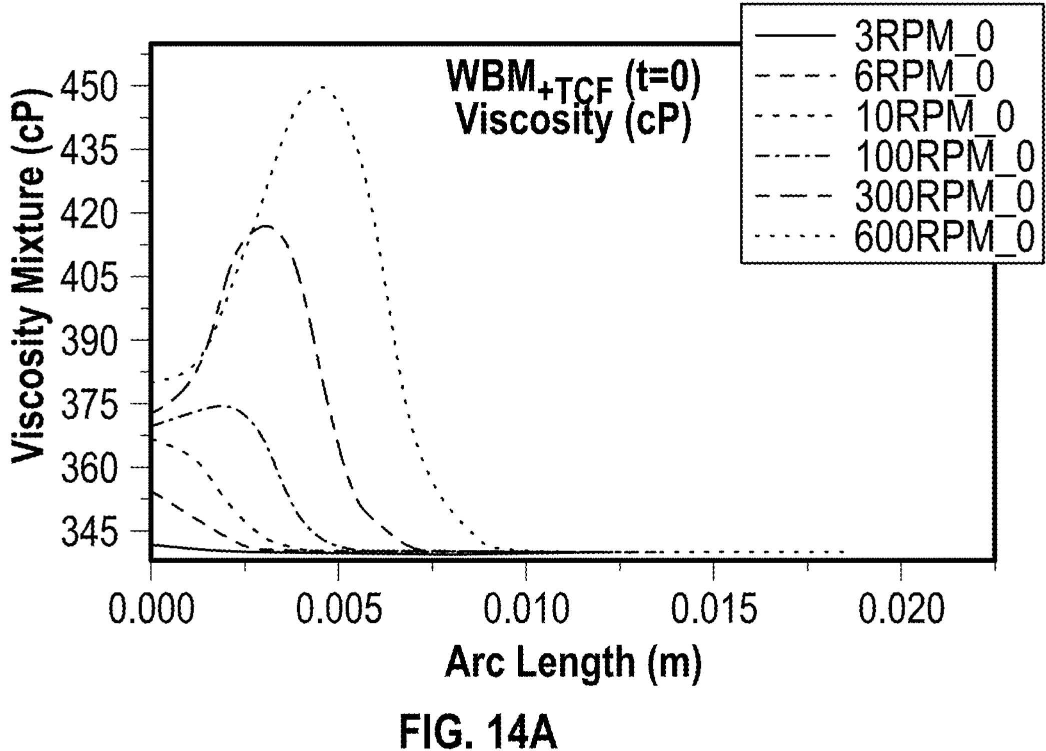
FIGS. 14A and 14B illustrate viscosity distributions at different rotation rates for WBM_TCF according to one or more embodiments of the present disclosure.
Figure 14B:
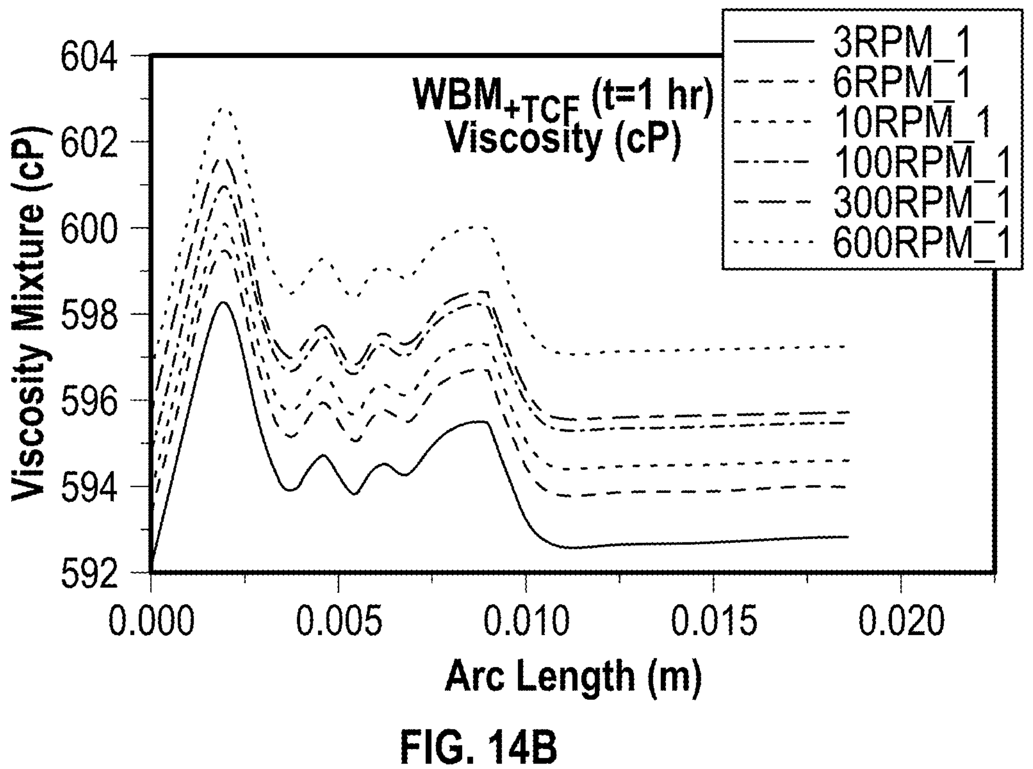
Figure 15A:
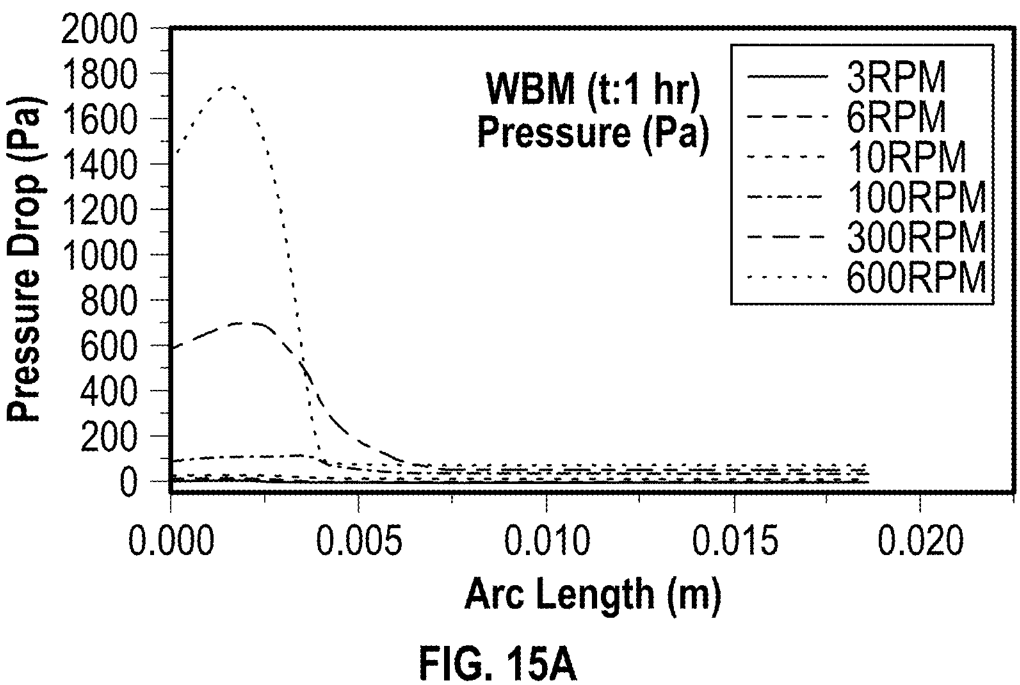
FIGS. 15A and 15B illustrate comparisons of pressure drop distributions at different rotation rates for WBM and WBM_TCF according to one or more embodiments of the present disclosure.
Figure 15B:
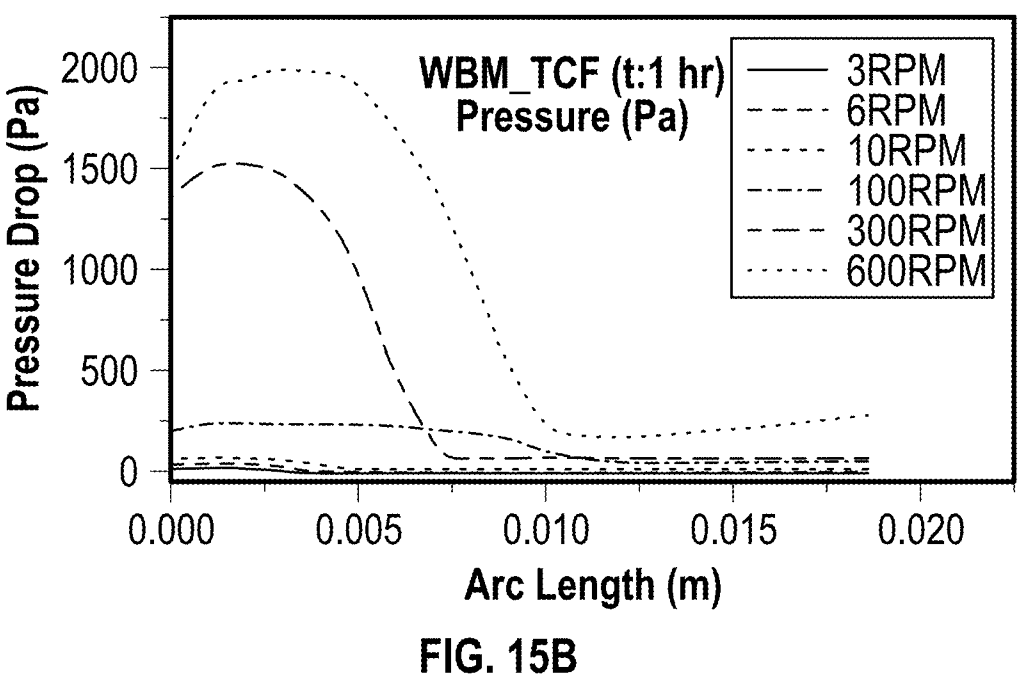

The viscosity of a fluid has a significant impact on barite segregation. Thus, it is widely believed that barite settling may be effectively minimized through modification of rheological properties and/or improving the viscosity. Accordingly, the viscosity profiles displayed in FIGS. 13A-13B and 14A-14B corroborate the barite segregation patterns that have been discussed in the preceding sections. In the Couette geometry, the shear rate varies radially across the distance. The shear rate influences the particle distribution as well as other bulk properties of the fluid, such as viscosity and pressure drop. As shown in the results, the viscosity variation followed a similar pattern. It may be clearly observed that the viscosity of the mixture increases as the pipe rotation increases, because the fraction of the dispersed barite particles increased with the pipe rotation. In FIG. 13A, it may be observed that the WBM had maximum viscosity of 210 centipoise (cP), which increased to approximately 284 cP after one hour pipe rotation, as shown in FIG. 13B. In comparison, the WBM_TCF exhibited a maximum viscosity of approximately 450 at t=0 (FIG. 14A), which increased to approximately 600 cP after one hour pipe rotation (FIG. 14B). FIGS. 15A and 15B illustrate comparisons of pressure drop distributions at different rotation rates for WBM and WBM_TCF, respectively. FIGS. 15A and 15B show that the WBM_TCF experiences higher pressure drops after one hour of rotation compared with WBM.

FIG. 16 is a flow diagram depicting the method according to one or more embodiments of this disclosure. As described in detail above, in block 1600, a set of rheological data for a first drilling fluid having a composition is obtained. The set of rheological data includes a measured viscosity value. A thermal effect of the measured viscosity value is determined in block 1602. Based on the thermal effect, a predicted viscosity value for a second drilling fluid having a similar (or identical) composition to the first drilling fluid is determined in block 1604. Based on the predicted viscosity value, an amount of a thermochemical fluid to add to the second drilling fluid to increase the temperature and viscosity such that particulate settling is mitigated is determined in block 1606.

Figure 17:
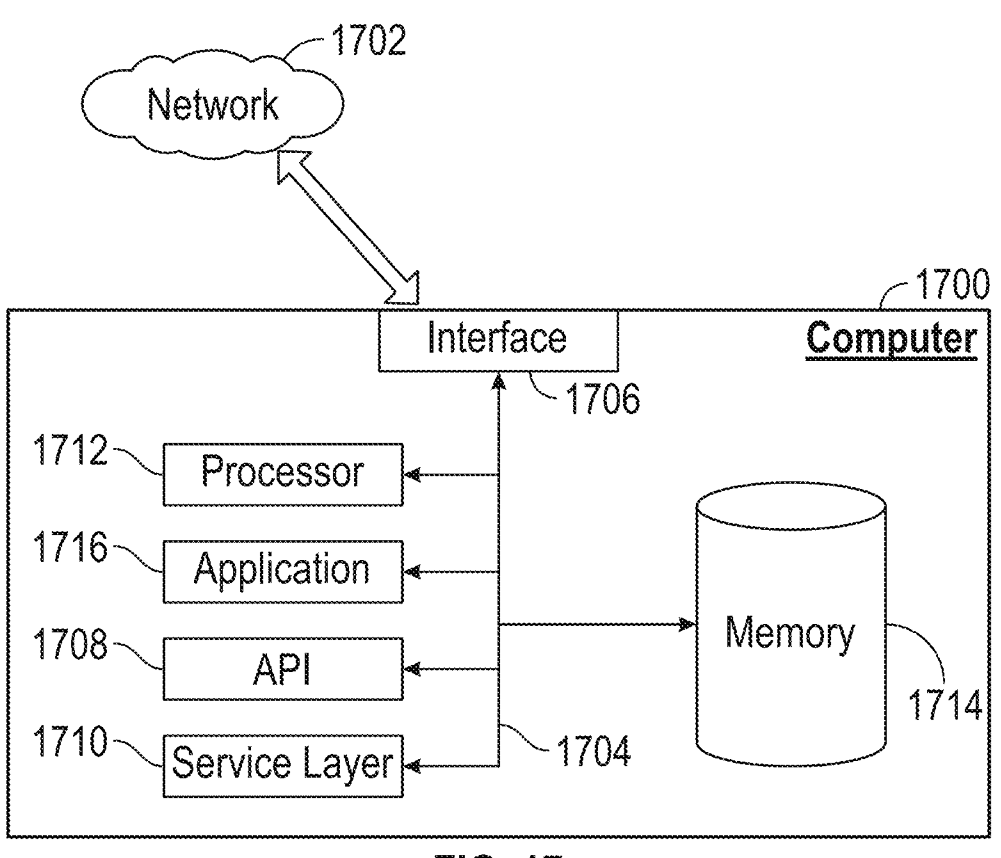
FIG. 17 illustrates a computing system according to one or more embodiments of the present disclosure.

FIG. 17 depicts a block diagram of a computer (1700) used to provide computational functionalities associated with described algorithms, methods, functions, processes, flows, and procedures as described in this disclosure, according to one or more embodiments. The illustrated computer (1700) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1700) may include an input device, such as a keypad, keyboard, touch screen, or other device that can accept user information, and an output device that conveys information associated with the operation of the computer (1700), including digital data, visual, or audio information (or a combination of information), or a GUI.

The computer (1700) may serve in a role as a client, network component, a server, a database or other persistency, or any other component (or a combination of roles) of a computer system for performing the subject matter described in the instant disclosure. The illustrated computer (1700) is communicably coupled with a network (1702). In some implementations, one or more components of the computer (1700) may be configured to operate within environments, including cloud-computing-based, local, global, or other environment (or a combination of environments).

At a high level, the computer (1700) is an electronic computing device operable to receive, transmit, process, store, or manage data and information associated with the described subject matter. According to some implementations, the computer (1700) may also include or be communicably coupled with an application server, e-mail server, web server, caching server, streaming data server, business intelligence (BI) server, or other server (or a combination of servers).

The computer (1700) may receive requests over network (1702) from a client application (for example, executing on another computer (1700)) and responding to the received requests by processing the said requests in an appropriate software application. In addition, requests may also be sent to the computer (1700) from internal users (for example, from a command console or by other appropriate access method), external or third-parties, other automated applications, as well as any other appropriate entities, individuals, systems, or computers.

Each of the components of the computer (1700) can communicate using a system bus (1704). In some implementations, any or all of the components of the computer (1700), both hardware or software (or a combination of hardware and software), may interface with each other or the interface (1706) (or a combination of both) over the system bus (1704) using an application programming interface (API) (1708) or a service layer (1710) (or a combination of the API (1708) and service layer (1710)). The API (1708) may include specifications for routines, data structures, and object classes. The API (1708) may be either computer-language independent or dependent and refer to a complete interface, a single function, or even a set of APIs. The service layer (1710) provides software services to the computer (1700) or other components (whether or not illustrated) that are communicably coupled to the computer (1700). The functionality of the computer (1700) may be accessible for all service consumers using this service layer. Software services, such as those provided by the service layer (1710), provide reusable, defined business functionalities through a defined interface. For example, the interface may be software written in JAVA, C++, or other suitable language providing data in extensible markup language (XML) format or another suitable format. While illustrated as an integrated component of the computer (1700), alternative implementations may illustrate the API (1708) or the service layer (1710) as stand-alone components in relation to other components of the computer (1700) or other components (whether or not illustrated) that are communicably coupled to the computer (1700). Moreover, any or all parts of the API (1708) or the service layer (1710) may be implemented as child or sub-modules of another software module, enterprise application, or hardware module without departing from the scope of this disclosure.

The computer (1700) includes an interface (1706). Although illustrated as a single interface (1706) in FIG. 17, two or more interfaces (1706) may be used according to particular needs, desires, or particular implementations of the computer (1700). The interface (1706) is used by the computer (1700) for communicating with other systems in a distributed environment that are connected to the network (1702). Generally, the interface (1706) includes logic encoded in software or hardware (or a combination of software and hardware) and operable to communicate with the network (1702). More specifically, the interface (1706) may include software supporting one or more communication protocols associated with communications such that the network (1702) or interface's hardware is operable to communicate physical signals within and outside of the illustrated computer (1700).

The computer (1700) includes at least one computer processor (1712). Although illustrated as a single computer processor (1712) in FIG. 17, two or more processors may be used according to particular needs, desires, or particular implementations of the computer (1700). Generally, the computer processor (1712) executes instructions and manipulates data to perform the operations of the computer (1700) and any algorithms, methods, functions, processes, flows, and procedures as described in the instant disclosure.

The computer (1700) also includes a memory (1714) that holds data for the computer (1700) or other components (or a combination of both) that can be connected to the network (1702). For example, memory (1714) can be a database storing data consistent with this disclosure. Although illustrated as a single memory (1714) in FIG. 17, two or more memories may be used according to particular needs, desires, or particular implementations of the computer (1700) and the described functionality. While memory (1714) is illustrated as an integral component of the computer (1700), in alternative implementations, memory (1714) can be external to the computer (1700).

The application (1716) is an algorithmic software engine providing functionality according to particular needs, desires, or particular implementations of the computer (1700), particularly with respect to functionality described in this disclosure. For example, application (1716) can serve as one or more components, modules, applications, etc. Further, although illustrated as a single application (1716), the application (1716) may be implemented as multiple applications (1716) on the computer (1700). In addition, although illustrated as integral to the computer (1700), in alternative implementations, the application 1716 can be external to the computer (1700).

There may be any number of computer systems associated with, or external to, a computer system containing computer (1700), wherein each computer (1700) communicates over network (1702). Further, the term "client," "user," and other appropriate terminology may be used interchangeably as appropriate without departing from the scope of this disclosure. Moreover, this disclosure contemplates that many users may use one computer (1700), or that one user may use multiple computers (1700).

As described in detail above, experimental studies of the rheological characteristics as well as numerical simulations using computational fluid dynamics (CFD) were conducted in order to produce a method of improving the rheological performance of water-based drilling fluid against barite sag. The method involves adding a determined concentration of thermochemical fluid (TCF), such as in Example 1, to the drilling fluid to increase both the temperature and the viscosity of the drilling fluid.

Water-based mud (WBM) with encapsulated TCF was prepared. Rheological tests were conducted under low and high temperature ranges. Numerical modeling and simulation using CFD were guided with the rheological data of the drilling fluids (both WBM and WBM_TCF), with consideration for the thermal activation energy, due to effect of temperature flow behavior of the fluids as a notable contribution knowledge. Observations from the experimental studies may be summarized as follows.

The drillings fluids conform to the shear thinning pseudoplastic behavior within the conditions operated in the studies. Notably, the apparent viscosity of the WBM was observed to decrease with increasing temperature between 25° C. and 50° C., but increased afterwards. At higher temperatures (70° C. to 120° C.), which correspond to the conditions of the WBM_TCF, it was found that the WBM_TCF exhibits lower potential for barite sag due to lower settling velocity of the particles. The reason may be due to the higher viscosity of the WBM_TCF. The CFD studies considered both the hydrodynamic forces and shear induced migration of the particles. Analyses of various simulation results, including particle flux, particle mass fraction, mixture viscosity, and the pressure drop, consistently revealed that the WBM_TCF may have lower barite segregation potential compared with other types of drilling fluids considered in the study.

The results from the CFD corroborate those calculated using Stokes Law. From the Stokes gravitational setting characteristics, it was observed that the WBM_TCF experienced lower settling rates ($V_{STH}$) compared with conventional fluids. Although according to Stokes law, the settling rate was observed to increase with increasing shear rates. On the contrary, from the CFD simulation results, it may be inferred that the settling tendency decreases with increasing rotation rates. This is because the CFD simulation accounts for both gravitational force and particle resuspension due to shear force.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for mitigating particulate settling in a drilling fluid, comprising:

obtaining, by measuring a viscosity of a first drilling fluid, a set of rheological data for the first drilling fluid having a composition, wherein the set of rheological data comprises a measured viscosity value;

determining a thermal effect of the measured viscosity value;

determining, based on the thermal effect, a predicted viscosity value for a second drilling fluid having a composition that is similar to the composition of the first drilling fluid;

determining an amount of a thermochemical fluid to add to the second drilling fluid;

adding the determined amount of the thermochemical fluid to the second drilling fluid, thereby increasing a temperature and a viscosity of the second drilling fluid such that settling of a particulate is mitigated; and determining a flow consistency index K and a flow behavior index n for the first drilling fluid according to the following:

$$\mu_a = K\dot{\gamma}^{n-1} \text{ and}$$

$$\ln\mu_a = \ln K + (n-1)\ln\dot{\gamma},$$

where $\mu_a$ is the measured viscosity value and $\dot{\gamma}$ is a shear rate, wherein the predicted viscosity value $\mu_p$ is determined according to the following:

$$\mu_p = K_0 \exp\left(\frac{E_a}{RT}\right)\dot{\gamma}^{n-1},$$

where $K_o$ is the thermal effect, $E_a$ is a flow activation energy, R is a universal gas constant, and T denotes temperature.

2. The method of claim 1, wherein the thermal effect is a temperature dependency of the measured viscosity value.

3. The method of claim 1, wherein the thermochemical fluid comprises one or more of $NH_4Cl$ and $NaNO_2$.

4. The method of claim 1, wherein the thermochemical fluid is added to the second drilling fluid in amount ranging from 3 $mol/dm^3$ to 5 $mol/dm^3$.

5. The method of claim 1, wherein the first drilling fluid and the second drilling fluid are water-based drilling fluids.

6. The method of claim 1, wherein the particulate is barite.

7. The method of claim 1, wherein the amount of the thermochemical fluid is determined based on a quantity of the second drilling fluid, a heat capacity of the second drilling fluid, and a heat capacity of the thermochemical fluid.

8. A system for mitigating particulate settling in a drilling fluid, comprising:

a processor configured to perform operations of:

obtaining, by measuring a viscosity of a first drilling fluid, a set of rheological data for the first drilling fluid having a composition, wherein the set of rheological data comprises a measured viscosity value;

determining a thermal effect of the measured viscosity value;

determining, based on the thermal effect, a predicted viscosity value for a second drilling fluid having a composition that is similar to the composition of the first drilling fluid;

determining, based on the predicted viscosity value, an amount of a thermochemical fluid to add to the second drilling fluid to increase a temperature and a viscosity of the second drilling fluid such that settling of a particulate is mitigated, wherein the system is configured to add the determined amount of the thermochemical fluid to the second drilling fluid, wherein the processor is configured to perform an operation of determining a flow consistency index K and a flow behavior index n for the first drilling fluid according to the following:

$$\mu_a = K\dot{\gamma}^{n-1} \text{ and}$$

$$\ln\mu_a = \ln K + (n-1)\ln\dot{\gamma},$$

where $\mu_a$ is the measured viscosity value and $\dot{\gamma}$ is a shear rate, and wherein the predicted viscosity value $\mu_p$ is determined according to the following:

$$\mu_p = K_0 \exp\left(\frac{E_a}{RT}\right)\dot{\gamma}^{n-1},$$

where $K_o$ is the thermal effect, $E_a$ is a flow activation energy, R is a universal gas constant, and T denotes temperature.

9. The system of claim 8, wherein the thermal effect is a temperature dependency of the measured viscosity value.

10. The system of claim 8, wherein the thermochemical fluid comprises one or more of $NH_4Cl$ and $NaNO_2$.

11. The system of claim 8, wherein the thermochemical fluid is added to the second drilling fluid in amount ranging from 3 mol/dm$^3$ to 5 mol/dm$^3$.

12. The system of claim 8, wherein the first drilling fluid and the second drilling fluid are water-based drilling fluids.

13. The system of claim 8, wherein the particulate is barite.

14. The system of claim 8, wherein the amount of the thermochemical fluid is determined based on a quantity of the second drilling fluid, a heat capacity of the second drilling fluid, and a heat capacity of the thermochemical fluid.

* * * * *